United States Patent
Pcolka et al.

(10) Patent No.: US 12,415,500 B2
(45) Date of Patent: Sep. 16, 2025

(54) PREDICTIVE POWER SPLIT WITH ZERO-EMISSION ZONE HANDLING

(71) Applicant: Garrett Transportation I Inc., Torrance, CA (US)

(72) Inventors: Matej Pcolka, Prague (CZ); Semaria Ruiz Alvarez, Prague (CZ); Kamil Dolinsky, Prague (CZ)

(73) Assignee: Garrett Transportation I Inc., Torrance, CA (US)

( * ) Notice: Subject to any disclaimer, the term of this patent is extended or adjusted under 35 U.S.C. 154(b) by 203 days.

(21) Appl. No.: 18/323,975

(22) Filed: May 25, 2023

(65) Prior Publication Data
US 2024/0391451 A1   Nov. 28, 2024

(51) Int. Cl.
*B60W 20/13*   (2016.01)
*B60W 50/00*   (2006.01)

(52) U.S. Cl.
CPC ........ *B60W 20/13* (2016.01); *B60W 50/0097* (2013.01); *B60W 2510/244* (2013.01); *B60W 2552/15* (2020.02); *B60W 2555/60* (2020.02)

(58) Field of Classification Search
CPC ...... B60L 15/20; B60L 2260/52; B60L 58/13; B60W 20/12; B60W 20/13; B60W 20/16; B60W 2510/244; B60W 2555/60; B60W 50/0097; B60W 2552/15
See application file for complete search history.

(56) References Cited

U.S. PATENT DOCUMENTS

| | | | |
|---|---|---|---|
| 7,482,769 B2 | 1/2009 | Kutsuna et al. | |
| 8,095,254 B2 | 1/2012 | Heap et al. | |
| 8,277,350 B2 | 10/2012 | Ai et al. | |
| 8,549,272 B2 | 10/2013 | Mullin et al. | |
| 9,014,893 B2 | 4/2015 | Yamamoto et al. | |
| 9,114,806 B2 | 8/2015 | Wang et al. | |
| 9,193,351 B2 | 11/2015 | Zhao et al. | |
| 9,221,455 B2 | 12/2015 | Ito et al. | |
| 9,440,655 B2 | 9/2016 | Roos et al. | |
| 9,476,721 B2 | 10/2016 | Ogawa | |
| 9,527,399 B2 | 12/2016 | Kim | |
| 9,539,996 B2 | 1/2017 | Kristinsson et al. | |

(Continued)

FOREIGN PATENT DOCUMENTS

| | | |
|---|---|---|
| EP | 1920986 B1 | 5/2013 |
| KR | 10-2015-0066080 A | 6/2015 |

OTHER PUBLICATIONS

Soldo, Jure et al., "Optimal Energy Management Control of a Parallel Plug-In Hybrid Electric Vehicle in the Presence of Low Emission Zones," SAE International, published Apr. 2, 2019, 11 pages.

(Continued)

*Primary Examiner* — Wade Miles
*Assistant Examiner* — Zachary Joseph Wallace
(74) *Attorney, Agent, or Firm* — Seager, Tufte & Wickhem LLP

(57) ABSTRACT

Hybrid vehicles and control methods for hybrid vehicles. The vehicles and methods are adapted for use with restricted emissions zones, including zero emission zones. The battery state of charge for a hybrid vehicle is controlled to enable passage through a zero emissions zone without the use of the engine in the zero emissions zone. Multiple approaches to the analysis are highlighted.

19 Claims, 20 Drawing Sheets

(56) References Cited

U.S. PATENT DOCUMENTS

| | | |
|---|---|---|
| 9,539,997 B2 | 1/2017 | Sun et al. |
| 9,616,879 B2 | 4/2017 | Zhao et al. |
| 9,802,601 B2 | 10/2017 | Wang et al. |
| 9,809,214 B2 | 11/2017 | Liang et al. |
| 9,821,791 B2 | 11/2017 | Dextreit |
| 10,000,201 B2 | 6/2018 | Kim et al. |
| 10,106,143 B2 | 10/2018 | Ogawa |
| 10,118,606 B2 | 11/2018 | Ogawa |
| 10,124,678 B2 | 11/2018 | Ogawa |
| 10,449,947 B2 | 10/2019 | Huh et al. |
| 10,591,914 B2 | 3/2020 | Palanisamy et al. |
| 10,611,361 B2 | 4/2020 | Park |
| 10,630,106 B2 | 4/2020 | Janssen et al. |
| 10,678,253 B2 | 6/2020 | Zeng et al. |
| 10,712,741 B2 | 7/2020 | Endo et al. |
| 10,946,853 B2 | 3/2021 | Aoki et al. |
| 10,955,842 B2 | 3/2021 | Zeng et al. |
| 11,136,020 B2 | 10/2021 | Cho et al. |
| 11,142,202 B2 | 10/2021 | Tsuda |
| 11,279,364 B2 | 3/2022 | Son |
| 2005/0228553 A1 | 10/2005 | Tryon |
| 2009/0101421 A1 | 4/2009 | Oyobe et al. |
| 2009/0118942 A1 | 5/2009 | Hsieh et al. |
| 2013/0325233 A1 | 12/2013 | Whitney et al. |
| 2018/0281772 A1* | 10/2018 | Hilliard .............. B60L 50/60 |
| 2020/0247390 A1 | 8/2020 | Kemura et al. |
| 2022/0161780 A1 | 5/2022 | Yokoyama et al. |
| 2022/0169234 A1 | 6/2022 | Yokoyama et al. |
| 2022/0306077 A1* | 9/2022 | Beinborn .......... B60W 30/1882 |
| 2022/0402477 A1* | 12/2022 | Huh .................... B60W 10/26 |
| 2023/0053614 A1* | 2/2023 | Baudisch ............ B60W 20/16 |
| 2023/0375635 A1* | 11/2023 | Noland ............... B60L 3/0046 |
| 2024/0132046 A1* | 4/2024 | Busse .................. B60L 53/62 |
| 2024/0351604 A1* | 10/2024 | Wehlen ................ B60W 10/04 |

OTHER PUBLICATIONS

Han et al., "Pre-emptive Power Management Controller of HEV for Zero Emissiom Zone Drive," 2022 IEEE Vehicle Power and Propulsion Conference, 5 Pages, Nov. 1, 2022.

International Search Report and Written Opinion for International Application No. PCT/US2024/017783, dated Jun. 20, 2024. (29 pages).

\* cited by examiner

PREDICTIVE POWER SPLIT WITH ZERO-EMISSION ZONE HANDLING

BACKGROUND

Zero emission zones (ZEZ) are being tested and planned in a number of cities and countries. A typical approach to a ZEZ is to classify vehicles by emissions per kilometer driven, with certain considerations for vehicle type (freight, bus, passenger car, etc.), and to charge vehicles for travel within the ZEZ in accordance with their vehicle class. For example, the Oxford (United Kingdom) ZEZ has classifications of a) Zero-emission vehicles emitting 0 g $CO_2$/km; b) Vehicles emitting less than 75 g $CO_2$/km; c) Vehicles emitting 75 g $CO_2$/km or more and compliant with either the Euro 4 emission standard for gasoline vehicles or the Euro 6 emission standard for diesel vehicles; and d) Vehicles not meeting any of the above emission criteria. For example, as of 2022, pricing to enter the Oxford ZEZ, using the above classification identifiers was a) £0 (US$0); b) £2 (US$2.8); c) £4 (US$5.5); and d) £10 (US$13.8). As the use of such restricted emissions zones advances, one may expect that higher emissions vehicles will eventually be subject to outright exclusion. While other cities/locations may vary in the application of these concepts, it is to be expected that vehicles will be categorized in one form or another for driving in or exclusion from such ZEZ zones, and also subject to graduated price structures.

Hybrid electric vehicles ("hybrid vehicles") have a first and second power sources, with the first power source taking the form, often, of an internal combustion engine (using, for example and without limitation, gasoline, diesel, natural gas, liquid propane, etc.), and a second power source in the form of a rechargeable battery. In some examples, the rechargeable battery may be sized for plug-in recharging, though smaller batteries may be used as desired. Vehicle admittance and/or entry pricing for ZEZ and other restricted emissions zones are likely to vary with the specific attributes of such hybrid vehicles.

One technical challenge associated with hybrid vehicles is the question of which power source to use, and when, to obtain optimized fuel consumption, performance, and/or emissions. The determination of which power source to use may be referred to as a "power split" determination. In the context of a ZEZ, one goal may be to enable a hybrid vehicle to be categorized as a zero-emissions vehicle for purposes of entry to the ZEZ, by including controls that will ensure adequate battery charge prior to entry to the ZEZ so that the vehicle can avoid activating the internal combustion engine while in the ZEZ.

U.S. Pat. No. 9,821,791 (the '791 Patent) proposes that a route planning mechanism can be used for a hybrid vehicle to determine an optimal hybrid driving mode for each of a plurality of route segments. In the '791 Patent, if only electric vehicle (EV) operation is mandated for a segment of the route, for example by legislation, the vehicle controller can be configured to ensure that the battery is sufficiently charged to complete the EV-only segment using only the battery power source. While the use of a special mode in this manner may be helpful to managing the EV-only segment of road, which may be a ZEZ, it would likely create suboptimal operations in the hybrid vehicle in other parts of the trip, and the use of a special mode-approach can complicate the overall control architecture.

New and alternative approaches to the power split question are desired, particularly ones which can account for road preview information including ZEZ boundaries and the needs of the hybrid vehicle when travelling through a ZEZ until exit.

OVERVIEW

The present inventors have recognized, among other things, that a problem to be solved is the need for new and/or alternative vehicles and controllers to allow hybrid vehicles to pass through restricted emissions zones, including ZEZ areas, without using the engine in the restricted emissions zone. Route planning starts well ahead of ZEZ entry to allow for optimized control.

A first illustrative and non-limiting example takes the form of a vehicle comprising: a first power source and a second power source, the second power source being a rechargeable battery, the first and second power sources configured to provide drive power to a transmission for output to a wheel of the vehicle; a controller configured to determine power utilization between the first power source and the second power source, including generating a lower state of charge (SOC) limit value for the battery of the second power source; and a Navigation system configured to determine a vehicle route and identify in the vehicle route a restricted emissions zone; wherein: the controller is configured to receive an indication of an entry to and an exit from the restricted emissions zone along the vehicle route and adjust the lower state of charge limit value as a function of proximity to the restricted emissions zone by: determining a total charge from the second power source needed to traverse the restricted emissions zone from the entry location to the exit location; calculating a desired SOC at entry to the restricted emissions zone from the total charge; determining torque needed to reach the entry of the restricted emissions zone; and calculating a series of lower SOC limit values for use along the route which increase as distance to the entry location reduces.

Additionally or alternatively, the controller is configured to determine power utilization between the first power source and the second power source by performing a cost function minimization using a prediction horizon, wherein the series of lower SOC limit values are used in the cost function minimization as penalties responsive to the estimated SOC of the battery of the second power source at an end of the prediction horizon being below a lower SOC limit value at the end of the prediction horizon.

Additionally or alternatively, the controller is configured to reduce the lower SOC limit value upon entry to the restricted emissions zone.

Additionally or alternatively, the restricted emissions zone is a zero emissions zone (ZEZ), and one of the series of lower SOC limit values is set to allow the vehicle to traverse the ZEZ using only power from the second power source.

Additionally or alternatively, the controller is configured to determine control parameters for the first and second power sources such that the battery of the second power source has an actual SOC at the entry to the restricted emissions zone which enables the vehicle to traverse the restricted emissions zone while operating as an electric vehicle.

Additionally or alternatively, the controller is configured to calculate the series of lower SOC limit values for use along the route which increase as distance to the entry location reduces by working backward from a restricted zone entry SOC limit value that will allows the vehicle to traverse the restricted emissions zone while operating in a selected mode, to a default SOC limit value, and determining an SOC slope that defines differences from one SOC limit value to a next SOC limit value throughout the series of lower SOC limit values.

Additionally or alternatively, the controller is configured to determine torque needed to reach the entry of the restricted emissions zone by analysis of one or more of road grade, curvature, traffic, and speed limits in the vehicle route, further wherein the controller is configured to calculate the series of lower SOC limit values by: when torque needed is relatively high, generating a relatively lower change of SOC limit values from one value in the series to the next; when torque needed is relatively low, generating a relatively higher change of SOC limit values from one value in the series to the next.

Additionally or alternatively, the controller is configured to determine a total charge from the second power source needed to traverse the restricted emissions zone from the entry location to the exit location by analyzing one or more of road grade, curvature, traffic, and speed limits in the vehicle route.

Additionally or alternatively, the controller is configured to determine a total charge from the second power source needed to traverse the restricted emission zone from the entry location to the exit location by analyzing a prior trip through the restricted emissions zone.

Additional examples include methods of operation in such vehicles, as well as configurable controllers adapted to operate in such vehicles. For example, another illustrative and non-limiting example takes the form of a method of operation in a vehicle, the vehicle including a first power source and a second power source, the second power source being a rechargeable battery, the first and second power sources configured to provide drive power to a transmission for output to a wheel of the vehicle, the vehicle further including each of a controller configured to determine power utilization between the first power source and the second power source, including generating a lower state of charge (SOC) limit value for the battery of the second power source; and a Navigation system configured to determine a vehicle route and identify in the vehicle route a restricted emissions zone; the method comprising: the controller receiving an indication of an entry to and an exit from the restricted emissions zone along the vehicle route and adjusting the lower state of charge limit value as a function of proximity to the restricted emissions zone by: determining a total charge from the second power source needed to traverse the restricted emissions zone from the entry location to the exit location; calculating a desired SOC at entry to the restricted emissions zone from the total charge; determining torque needed to reach the entry of the restricted emissions zone; and calculating a series of lower SOC limit values for use along the route which increase as distance to the entry location reduces. The method may further include the vehicle charging the battery of the second power source to at least an SOC which is above the lower SOC limit values as the vehicle passes along the route. The above additional or alternative examples may apply to this method example as well.

Another illustrative and non-limiting example takes the form of a vehicle comprising: a first power source and a second power source, the second power source being a rechargeable battery, the first and second power sources configured to provide drive power to a transmission for output to a wheel of the vehicle; a controller configured to determine power utilization between the first power source and the second power source, including generating a lower state of charge (SOC) limit value for the battery of the second power source; and a Navigation system configured to determine a vehicle route and identify in the vehicle route a restricted emissions zone; wherein: the controller is configured to receive an indication of an entry to and an exit from the restricted emissions zone along the vehicle route and adjust the lower state of charge limit value as a function of proximity to the restricted emissions zone by: determining a total charge from the second power source needed to traverse the restricted emissions zone from the entry location to the exit location; calculating a desired SOC at entry to the restricted emissions zone from the total charge; extrapolating from a set of past or predicted future SOC values for the battery of the second power source a projected SOC value at entry to the restricted emission zone; further wherein the controller is configured to determine power utilization between the first power source and the second power source and generate control values for the first and second power sources by performing a cost function minimization using a prediction horizon, and wherein the cost function comprises a penalty term which is a product of a weighting value multiplied by an SOC shortfall calculated by subtracting the projected SOC value from the desired SOC at entry to the restricted emissions zone.

Additionally or alternatively, the controller is configured to determine a total charge from the second power source needed to traverse the restricted emissions zone from the entry location to the exit location by analyzing one or more of road grade, curvature, traffic, and speed limits in the vehicle route.

Additionally or alternatively, the controller is configured to determine a total charge from the second power source needed to traverse the restricted emission zone from the entry location to the exit location by analyzing a prior trip through the restricted emissions zone.

Additionally or alternatively, the set of past or predicted future SOC values includes one or more past SOC values and one or more future SOC values calculated within the prediction horizon.

Additionally or alternatively, the set of past or predicted future SOC values includes only future SOC values calculated within the prediction horizon.

Additional examples include methods of operation in such vehicles, as well as configurable controllers adapted to operate in such vehicles. Another illustrative and non-limiting example takes the form of a method of operation in a vehicle, the vehicle including a first power source and a second power source, the second power source being a rechargeable battery, the first and second power sources configured to provide drive power to a transmission for output to a wheel of the vehicle; the vehicle also having a controller configured to determine power utilization between the first power source and the second power source, including generating a lower state of charge (SOC) limit value for the battery of the second power source; and a Navigation system configured to determine a vehicle route and identify in the vehicle route a restricted emissions zone; the method comprising the controller receiving an indication of an entry to and an exit from the restricted emissions zone along the vehicle route and adjusting the lower state of charge limit value as a function of proximity to the restricted emissions zone by: determining a total charge from the second power source needed to traverse the restricted emissions zone from the entry location to the exit location; calculating a desired SOC at entry to the restricted emissions zone from the total charge; extrapolating from a set of past or predicted future SOC values for the battery of the second power source a projected SOC value at entry to the restricted emission zone; the method further including the controller determining power utilization between the first power source and the second power source and generating control values for the first and second power sources by performing a cost function minimization using a prediction horizon, and wherein the cost function comprises a penalty term which is a product of a weighting value multiplied by an SOC shortfall calculated by subtracting the projected SOC value from the desired SOC at entry to the restricted emissions zone. The method may further include the vehicle implementing a control solution determined from the cost function minimization as the vehicle proceeds to the entry location. The above additional or alternative examples may apply to this method example as well.

Another illustrative and non-limiting example takes the form of a vehicle comprising: a first power source and a second power source, the second power source being a rechargeable battery, the first and second power sources configured to provide drive power to a transmission for output to a wheel of the vehicle; a controller configured to determine power utilization between the first power source and the second power source, including generating a lower state of charge (SOC) limit value for the battery of the second power source; and a Navigation system configured to determine a vehicle route and identify in the vehicle route a restricted emissions zone; wherein: the controller is configured to receive an indication of an entry to and an exit from the restricted emissions zone along the vehicle route, and to perform a cost function analysis to determine operating parameters including power split between the first power source and the second power source as follows: including in a cost function a first term for a first prediction horizon having a first duration and a first sample length; including in the cost function a second term for a second prediction horizon occurring after the first prediction horizon, the second prediction horizon having a second duration that is at least twice the first duration and a second sample length that is at least twice the first sample length; and determining the operating parameters by minimizing the cost function including calculations throughout the first prediction horizon and the second prediction horizon.

Additionally or alternatively, the second prediction horizon is sufficiently long to include each of the entry to and the exit from the restricted emissions zone.

Additionally or alternatively, the second prediction horizon is at least ten times as long as the first prediction horizon, and the second sample length is at least ten times the first sample length.

Additionally or alternatively, the controller is configured to analyze a path through the restricted emissions zone and determine lower battery SOC limit for entry to the restricted emissions zone; and the controller is configured to determine a predicted battery SOC at entry to the restricted emissions zone as part of the cost function analysis, and include a penalty in the cost function analysis applicable if the predicted battery SOC at entry to the restricted emission zone is below the lower battery SOC limit for entry to the restricted emissions zone.

Additionally or alternatively, the controller is configured to determine the lower battery SOC limit for entry to the restricted emission zone by analyzing one or more of road grade, curvature, traffic, and speed limits in the vehicle route.

Additionally or alternatively, the controller is configured to determine lower battery SOC limit for entry to the restricted emissions zone from data related to a prior traverse of the restricted emissions zone by the vehicle; and the controller is configured to determine a predicted battery SOC at entry to the restricted emissions zone as part of the cost function analysis, and include a penalty in the cost function analysis applicable if the predicted battery SOC at entry to the restricted emission zone is below the lower battery SOC limit for entry to the restricted emissions zone.

Additional examples include methods of operation in such vehicles, as well as configurable controllers adapted to operate in such vehicles. For example, an illustrative and non-limiting example may take the form of a method of operation in a vehicle, the vehicle including a first power source and a second power source, the second power source being a rechargeable battery, the first and second power sources configured to provide drive power to a transmission for output to a wheel of the vehicle; the vehicle also including a controller configured to determine power utilization between the first power source and the second power source, including generating a lower state of charge (SOC) limit value for the battery of the second power source; and a Navigation system configured to determine a vehicle route and identify in the vehicle route a restricted emissions zone; the method comprising the controller receiving an indication of an entry to and an exit from the restricted emissions zone along the vehicle route, and performing a cost function analysis to determine operating parameters including power split between the first power source and the second power source as follows: including in a cost function a first term for a first prediction horizon having a first duration and a first sample length; including in the cost function a second term for a second prediction horizon occurring after the first prediction horizon, the second prediction horizon having a second duration that is at least twice the first duration and a second sample length that is at least twice the first sample length; and determining the operating parameters by minimizing the cost function including calculations throughout the first prediction horizon and the second prediction horizon. The method may further include the vehicle implementing the operating parameters determined from the cost function minimization as the vehicle proceeds to the entry location. The above additional or alternative examples may apply to this method example as well.

This overview is intended to provide an introduction to the subject matter of the present patent application. It is not intended to provide an exclusive or exhaustive explanation. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
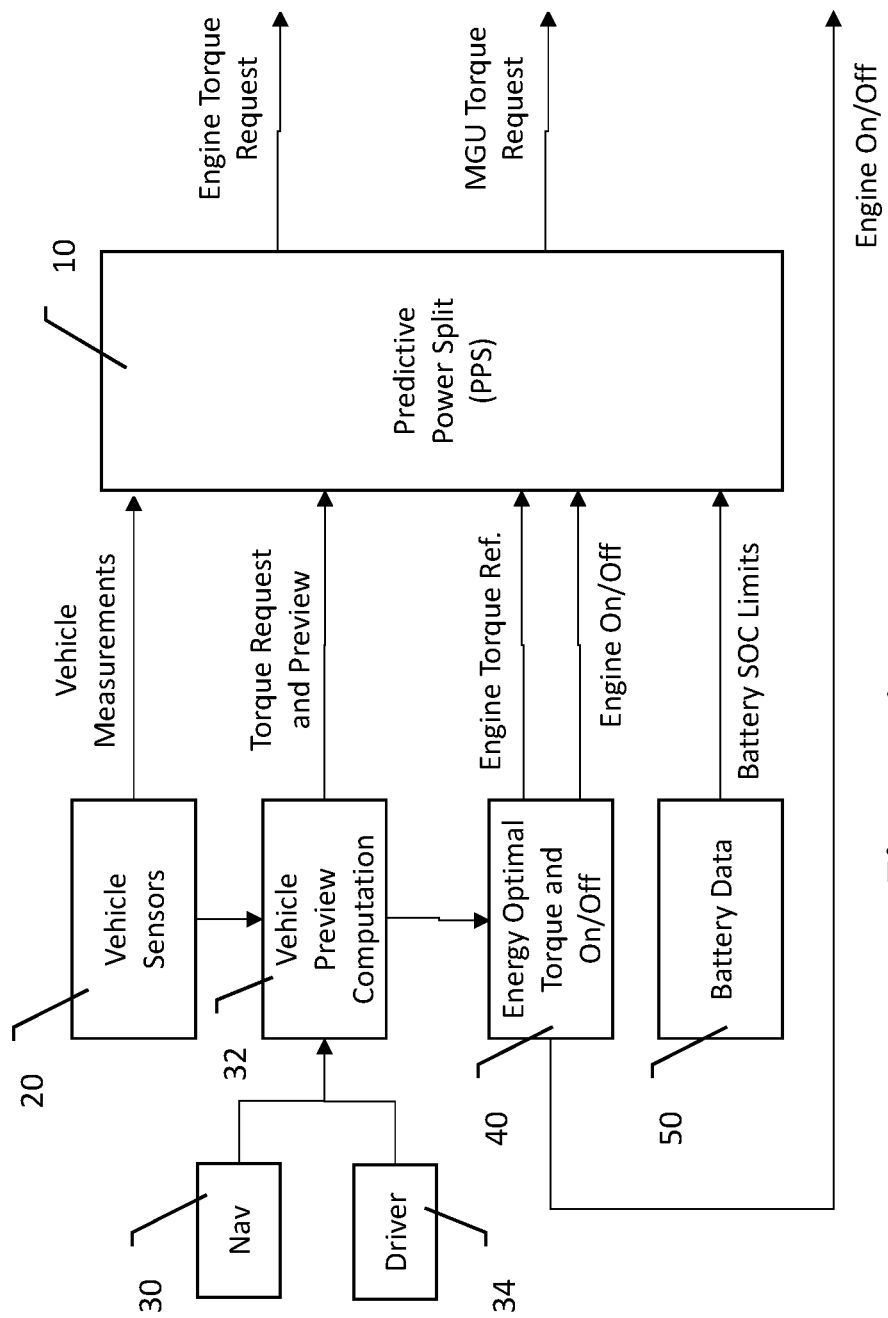
FIG. 1 is a block diagram of an overall control architecture.

FIG. 1 is a block diagram giving a functional overview of an example. A predictive power split (PPS) 10 serves as an optimization step for determining an engine torque request and a motor generator unit (MGU) torque request. The determination of these two torques is the "power split" of a hybrid powertrain. The engine may take a variety of forms, including diesel, gasoline, natural gas or other internal combustion engine, for example. The MGU obtains power from a rechargeable battery.

The PPS block 10 takes inputs from vehicle sensors 20, which provide vehicle measurements such as, for example and without limitation, vehicle speed/velocity, external conditions (sensed surrounding vehicles for example), state of charge (SOC) of batteries (including the MGU battery as well as the vehicle's general-purpose battery). The PPS block 10 may also consider power demands exerted by other systems (air conditioning, heating, other power/electric use) in the vehicle that may affect the available power for driving the vehicle by, for example, requiring torque from the engine to power non-motive systems of the vehicle.

A vehicle preview computation block is shown at 32, and obtains data from the vehicle sensors 20 relating to surroundings (including whether, for example, a lead vehicle is sensed in front of the vehicle). As used herein, an ego vehicle is the controlled vehicle, as opposed to a lead vehicle or trailing vehicle which are in front of, or behind, the ego vehicle on the route. A vehicle travelling in front of the ego vehicle may be considered a lead vehicle if it is within a predetermined distance (which may vary with travel speed) of the ego vehicle, or if it is likely to be overtaken within the time frame of the preview window, for example and without limitation. A lead vehicle may be considered if it is within the sensor range of the ego vehicle, in some examples, such as if a radar, lidar, or visual system is used to detect the lead vehicle, the sensing systems may have limited range (for example, a radar may be limited to 200 meters, or more or less), or due to other physical limitations, such as a visual system being unable to see around corners/curves. A lead vehicle may be considered as well if its position is communicated to the ego vehicle, such as by direct communication or by notification from an infrastructure or cloud-based system.

The vehicle preview computation 32 also obtains preview information, that is, data from the navigation system, shown as Nav 30. Nav 30 may provide information related to the upcoming travel route, including road grade, road curvature, prevailing speed, traffic, traffic signals, weather, road quality, speed limits, etc. Nav 30 may also obtain or receive data for emissions zones along the upcoming travel route, such as non-restricted emissions zones, or restricted emissions zones such as zero-emissions-zone (ZEZ) locations, or low emissions zones (LEZ) or ultra-low emissions zones (ULEZ). Nav 30 may obtain data by communicating with surrounding traffic infrastructure, cellular and/or other data networks, and/or fleet control systems, as desired. Any suitable transmission, receiving, transceiver, antennae/drivers, etc. and other communications hardware may be included.

The upcoming travel route may be a planned travel route, such as when a destination has been identified, or may be an anticipated travel route, whether known from historical driving patterns of a vehicle, or predicted based on current vehicle location and/or travel direction, for example, assuming that the vehicle will stay on the road and traveling in the direction it is presently on. The vehicle preview computation 32 may also obtain data from the driver 34, including, for example, wheel torque request, acceleration and/or braking request, and/or steering request. The vehicle preview computation 32 may use, for example, a requested vehicle speed set in the cruise controller by the driver. The driver may also provide mode information to the vehicle preview computation, such as for optimizing any of speed, fuel efficiency, comfort, or other factors.

In an illustrative example, the vehicle preview computation 32 uses data from the Nav 30, driver 34, and/or vehicle sensors 20 to calculate a vehicle speed reference for the upcoming travel route, accounting for traffic, speed limits, safety or comfort limits (vehicle sway), vehicle limits, and lead vehicle data. In some examples, the assumption is that a driver (whether human or not) will accelerate the vehicle until the maximum speed (limited by posted speed limits, safety concerns, traffic, or a comfort constraint) is reached. The vehicle speed reference may, for example, account for a lead vehicle by determining or estimating lead vehicle speed, finding a distance to the lead vehicle, and determining the ego vehicle speed that will not violate a minimum distance to lead vehicle constraint. For purposes of the calculation, overtaking or passing the lead vehicle is not necessarily considered, though it could be. If overtaking or passing the lead vehicle is allowed, lead vehicle calculations could be omitted to the extent the ego vehicle is not limited by the lead vehicle.

The vehicle preview computation 32 also calculates a predictive torque request along the upcoming travel route, which may include a current or next sample operating point and operating points going into the future timeline. In an example, the predictive torque request is the overall torque request which is to be fulfilled by the combined engine torque request and the MGU torque request that the PPS will be issuing. In an example, the predictive torque request is determined using the vehicle speed reference, route information (grade and curvature, which may be augmented if desired using windspeed or other weather data), and vehicle information (various losses such as due to friction, heat, other torque demands, such as transmission losses, tire-related losses, resistance related to aerodynamics, load, etc.) for the route within a prediction horizon. That is, the force (torque) needed to allow the vehicle to maintain the vehicle speed reference along the route is determined as the transmission torque request. Selected preview information, the torque request and, optionally, the vehicle speed reference may then be provided to the PPS 10.

An energy optimal torque and engine on/off block is also shown at 40. Two functions are provided in block 40 to determine the energy optimal references for the PPS optimization block. These are the engine torque reference, and the engine On/Off reference along the prediction horizon.

In block 40, an engine torque reference is determined using total power minimization (TPM) analysis and/or brake specific fuel consumption (BSFC) minimization analysis. The TPM calculation searches for the optimal engine torque reference throughout the prediction horizon to yield the optimized equivalent power use, considering each of fuel consumption and changes in the SOC of the MGU battery. The engine torque reference for a BSFC approach may be calculated by searching for a minimum specific fuel consumption for a given torque request of the engine at a given engine speed. Illustrative TPM and BSFC examples are provided, for example, in U.S. patent application Ser. No. 17/969,181, filed Oct. 19, 2022, titled ENERGY EFFI- CIENT PREDICTIVE POWER SPLIT FOR HYBRID POWERTRAINS. In some examples herein, a target battery SOC may vary over the course of the vehicle travel route, which will influence the outcome of BSFC and/or TPM analysis The ego vehicle speed reference may be considered along with transmission gear request (when applicable) to determine the drive shaft speed. The transmission gear request is obtained from the transmission logic, which is given by the manufacturer of the vehicle. The transmission gear request will define a gear ratio (whether from a continuously variable transmission or from a transmission having selectable gears), from which the drive shaft speed can be determined using the speed reference. The drive shaft speed can be equated to the engine speed depending on the vehicle configuration. For example, a P2 configuration of a hybrid powertrain may be used. If so, a clutch separates the engine from the motor generator unit (MGU) allowing the MGU to provide drive power when the engine is off, for example. With a P2 configuration, the engine speed and MGU speed are the same when the clutch is engaged. This allows the maximum and minimum torque available from each of the engine and MGU to be readily calculated using the drive shaft speed, which can be obtained using the transmission gear request and the ego vehicle speed reference through the prediction horizon. In addition, if the drive shaft speed is known, then a maximally efficient engine torque can be calculated from the engine map provided by the manufacturer, which will map maximum torque efficiency for a given engine speed.

The Engine On/Off determination of block 40 is optional but will usually be included in an implementation. In examples, the MGU is able to fully power the vehicle for periods of time, and the question is whether and when the engine may be turned off to allow electric-only operation. Block 40 may perform a rules-based calculation and/or a cost calculation to determine whether and when the engine can be switched from On to Off, and from Off to On, for example, as further detailed in U.S. patent application Ser. No. 17/969,181, filed Oct. 19, 2022, titled ENERGY EFFICIENT PREDICTIVE POWER SPLIT FOR HYBRID POWERTRAINS.

Finally a set of battery data is provided at block 50. This may include Battery State of Charge (SOC) limits and/or battery SOC references, as indicated. SOC limits may be fixed or may vary in response to various battery characteristics, including internal temperature, age and/or battery state of health, for example. SOC limits on the battery may further include limits on how frequently, or for how long, the battery is charged, discharged, or held at selected levels of SOC and state of health. In some examples, it may be desired for the battery to remain at selected level of SOC, and block 50 may provide the battery SOC reference for the PPS optimization to stay at the SOC target.

The battery SOC references, in an example, may depend on route analysis using data from the Nav 30. In particular, when a restricted emissions zone (ZEZ, LEZ, or ULEZ) is upcoming, an SOC battery target can be swapped into the overall optimization routine. In some examples, a battery SOC lower limit is manipulated in response to the upcoming restricted emissions zone. For a ZEZ, the SOC battery target at the point in time of entering the zone may be calculated using an analysis of route, including the generation of the torque request preview for the ZEZ zone, to which a safety margin may be added to ensure that the SOC remains above some threshold when the vehicle exits the ZEZ. For an LEZ or ULEZ, an analysis of the torque request preview can be used to determine a battery SOC target for entry to the restricted emissions zone that will allow the engine to be used no more than would be allowed for the restricted emissions zone or for a particular emissions/price tier of the restricted emissions zone.

In another example, given a restricted emissions zone with multiple pricing tiers or access rules available, the analysis may be configured to use a torque request preview to determine the capability of the vehicle to pass through a restricted emissions zone while meeting emissions limits applicable to a particular price tier or access rule. That is, for example, if a hybrid vehicle would not be able to pass entirely through a restricted emissions zone in only EV mode, the system may determine which of several emissions/pricing tiers the vehicle can conform to, and sets the battery SOC target to allow the lowest possible emissions/pricing tiers to be met. When considering any hybrid operation in a restricted emissions zone, the modelling may be performed to set battery SOC target for both entry and exit of the restricted emissions zone to comply with a desired emissions tier. In some examples, a communications system, such as one present in the Nav 30, may provide output communications to sensors or systems at a restricted emissions zone entry to indicate which of the available emissions rules or pricing tiers the vehicle will comply with while passing through the restricted emissions zone.

The PPS 10 then takes the provided information to split the transmission torque request into each of an engine torque request and an MGU torque request, subject to actual measurements, given preview data, references, and operating limits. The two outputs are then issued to the engine controller and the MGU controller, respectively, which will then implement control commands to generate the desired torques. In some examples, the PPS 10 is implemented as to provide a real-time solution of an optimization problem, such as using Model Predictive Control (MPC), including for example, non-linear MPC (NMPC).

Some examples use a cost function to drive the MPC design, where the cost of various operational steps and characteristics, as weighted by system settings/tuning, are minimized to generate an optimized torque split through the prediction horizon.

Within the prediction and/or control window, a duration of seconds to minutes may be contemplated. However, in some examples, a small number of samples of the calculated prediction and control solution are implemented before the process is iterated and performed again. For example, the process may repeat with each data sample (for example, 100 Hz to 1 Hz, or more or less), so that only a single sample of the predictive power split is used. That is, the preview computation at 32 may cover a relatively longer portion of the driving segment, and the energy optimal torques from block 40 may be calculated using that longer view, but are updated so as to use less than half, or less than one-quarter, or less than ten percent of the preview window for control. Doing so enables more frequent updating of the control actions, allowing driver actions, changes in traffic or other conditions, and divergence between actual operation and modeled behavior to be continuously addressed with updates.

An illustrative example may be characterized by stating that the vehicle preview computation 32 determines from the driver, Nav 30 and/or vehicle sensors a vehicle speed reference, which also accounts for vehicle capabilities such as acceleration, traction, etc., providing an estimated speed profile along all or at least a portion of the route that is within the prediction horizon. The vehicle speed reference is provided to an energy optimal torque and on/off logic block 40, which generates engine torque references and engine on/off determinations by analysis of the estimated speed profile and vehicle/route preview information passed on by block 32 from the driver, Nav 30, and vehicle sensors 20. The PPS 10 then uses the engine torque references and engine on/off predictions from block 40, along with current torque request and preview information from block 32, to set the current power split and generate engine torque request and MGU torque request. The process may iterate from time to time, providing new torque references for the PPS 10 to apply. The PPS 10 uses the torque references from block 40 to evaluate the cost of various control actions when generating the torque requests. The PPS 10 may include in its cost function a term that associates a weighted cost with changing process parameters, such as changing engine torque request and/or battery SOC.

Overall the system is using a relatively longer view (the prediction horizon) to make control decisions on a sample by sample basis using received transmission (overall) torque requests from block 32. The driver's torque request (whether that driver is a person or an autonomous control) are considered for the current time step, while the rest of the prediction horizon torque requests are predicted by block 32. A modification to this overall control method is then also provided to account for restricted emissions zones, including ZEZ, LEZ and/or ULEZ regions, as set forth further below.

In FIG. 1, and in other drawings herein, the various control blocks (such as PPS 10, vehicle preview computation 32, energy optimal torque and On/Off block 40, etc.), may be embodied as one or more microcontrollers, microprocessors, computers, electronic control unit (ECU) or other physical manifestation of control/logic and other circuitry operating on embedded or stored instruction code to perform various analytical and logic functions, including the math described herein. In some example, a computer or microprocessor and associated memory may be included as an ECU in a vehicle and may include machine readable instructions on non-transitory media for performing processes as disclosed herein. While much of the discussion herein is focused on methods of operation and the analysis that takes place, it should be understood that the invention may be embodied in configurable controllers for use in a vehicle, as well as hybrid vehicles, which are programmed or configured (such as by storage of machine operable instructions in memory and or the use of application specific hardware) to perform the methods discussed and disclosed.

Figure 2:
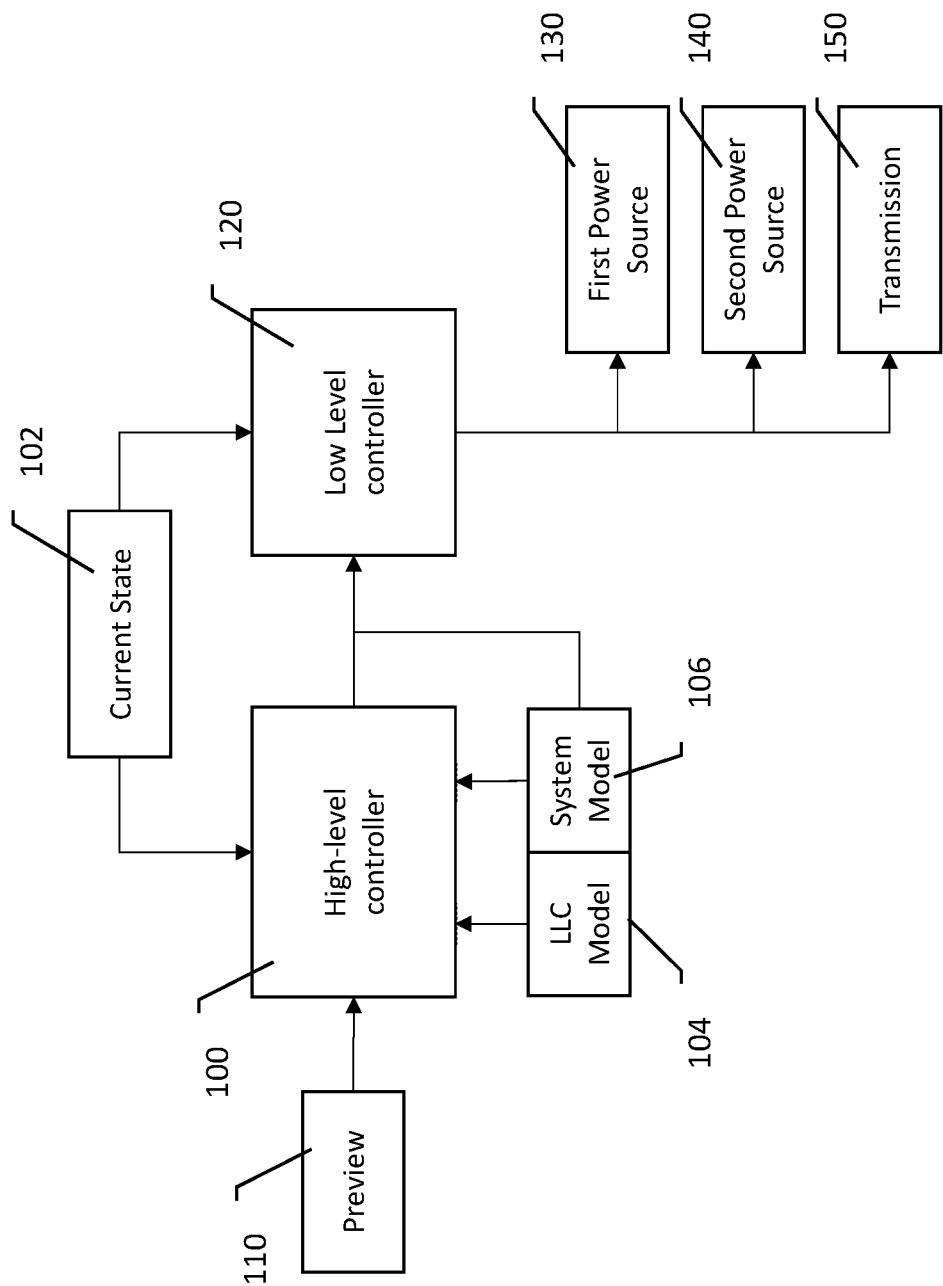
FIG. 2 is a block diagram of another overall control architecture.

The control approach shown in FIG. 1 may be implemented as shown in U.S. patent application Ser. No. 17/969,181, filed Oct. 19, 2022, titled ENERGY EFFICIENT PREDICTIVE POWER SPLIT FOR HYBRID POWERTRAINS. An alternative that may also be used is shown in FIG. 2, further details of which are provided in U.S. patent application Ser. No. 17/969,359, filed Oct. 19, 2022, titled HIERARCHICAL OPTIMAL CONTROLLER FOR PREDICTIVE POWER SPLIT.

FIG. 2 is a block diagram of another overall control architecture. A high-level controller 100 obtains current state data 102 which may include, for example, and without limitation, current wheel torque request, current vehicle/wheel speed, current battery SOC and current auxiliary electrical power demand. The high-level controller 100 also obtains preview information 110, which is used to determine, for example and without limitation, wheel torque requests, future vehicle/wheel speeds, future battery SOC requirements/limits, and/or future auxiliary electrical power demands. The preview information may be obtained using prediction models (e.g. driver prediction model, lead vehicle prediction model, auxiliary electric power prediction models, etc.).

In an illustrative example, the preview information 110 may be obtained as by using navigation system data, which may be obtained by communication to a remote server, such as by cellular or other communications. The navigation system data may include information about upcoming roadway as well as ZEZ or other restricted emissions zones. For example, knowing a destination, mapped route, or the currently traveled road, the system may determine data including speed limits, expected driver behavior, and/or traffic data to construct a speed profile that the vehicle may be expected to follow. In some examples, a driver prediction model may be used to predict the behavior of a driver. For example, in some embodiments, it may be assumed that the vehicle, from a current speed, will accelerate to the legal speed limit, or another speed limit such as a comfort-based speed limit (taking into account road curvature and vehicle sway limits, for example), or until a lead vehicle is reached, and will then stay at the speed limit or at a safe following distance from the lead vehicle. The preview information may also include traffic signal information, with the speed profile further adjusted to consider the effect of, for example and without limitation, upcoming stop lights that would require the vehicle to slow or stop and then accelerate, if desired.

The speed profile can then be used to estimate a total force or total torque demand of the vehicle power sources needed to traverse the upcoming roadway by accounting for drag, road curvature, road grade, etc. The torque demand may comprise a series of samples sufficient to traverse at least portion of the upcoming roadway in a prediction horizon, such as several seconds, tens of seconds, or longer, as desired. Additionally, the current and/or anticipated future demands of auxiliary power may be added to the torque demand. Other more general, or more complete, preview information 110 may be obtained, such as traffic, traffic management (speed limits, traffic signals, etc.), lead vehicle(s), weather conditions (wind, temperature, precipitation), etc., and the preview information need not be calculated according to this particular example.

The high-level controller 100 will also use models of the low-level controller 104 and a system model 106 capturing system dynamics and limitations. The model of the low-level controller may include analyses that the low-level controller would use to determine output settings, including the equations shown in greater detail in U.S. patent application Ser. No. 17/969,359, filed Oct. 19, 2022, titled HIERARCHICAL OPTIMAL CONTROLLER FOR PREDICTIVE POWER SPLIT. The system model 106 may, for example, incorporate a model of an MGU, for example, using an MGU efficiency map relating electric motor efficiency with, for example, electric motor speed, electric motor torque and/or electric motor power. The system model 106 may also include, for example, models of the other power source, such as a fuel cell or internal combustion engine, including an engine map which provides engine efficiency data for engine speed and torque demands. The system model 106 may also incorporate fuel consumption and electrical power consumption per engine start event, which can be used to calculate an engine start/stop penalty. The high-level controller 100 may use a dynamic model of battery relating battery SOC evolution with applied electric power, both charging and discharging.

Using preview information and prediction models, the high-level controller optimizes tuning parameters and/or other control inputs of the low-level controller such that a chosen cost function evaluated over the prediction horizon is minimized. The cost function can comprise terms related to fuel consumed over the prediction horizon, SOC limits violations and others. Fuel efficiency, or carbon or other emissions (NOx) may be modeled and used in the calculation. Examples herein additionally consider restricted emissions zones, such as ZEZ, LEZ and/or ULEZ in the upcoming travel path.

A specific example includes the high-level controller 100 calculating the equivalence factor $\lambda$ for a low-level controller that implements an Equivalent Consumption Minimization Strategy (ECMS). An ECMS approach optimizes the power split between the power sources (engine and MGU, for example) to minimize energy consumption. The equivalence factor $\lambda$ can be understood as the conversion coefficient between fuel energy and battery-stored electric energy. Because the analysis operates across a prediction horizon, which may be several to tens of seconds, or more, as desired, a series of optimized equivalence factors can be generated as a time vector $\lambda^* = \{\lambda^*(1), \lambda^*(2), \lambda^*(3) \ldots \lambda^*(n)\}$. At least a first sample of the series of optimized equivalence factors is communicated by the high-level controller to the low-level controller, which uses the received optimized equivalence factor as a tuning parameter for executing control operations. The analysis occurs in an environment which changes quickly as the vehicle moves, and so only one or a few samples of the calculated series of optimized equivalence factors may be used before the calculation is started over.

Another specific example may include the high-level controller 100 determining a target battery SOC at specific locations or points in time along the travel path, and providing the target battery SOC (whether one or several points are calculated varies as discussed below) for use by the low-level controller 120 when optimizing use of the first power source 130, second power source 140, and selections made for the transmission 150, such as gear choice. The low-level controller 120 may use, for example, a cost function optimization (minimization) analysis to determine control signals to issue to each of the first power source 130, second power source 140, and transmission 150.

Figure 3:
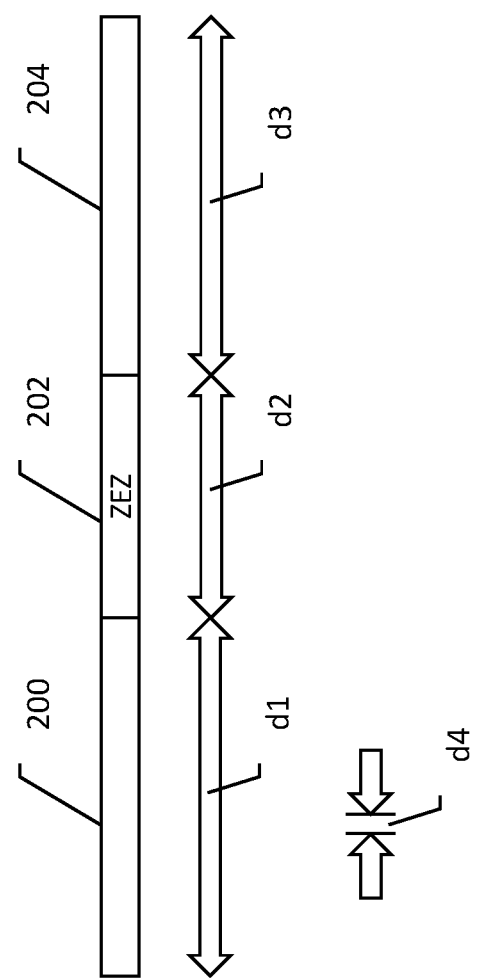
FIG. 3 illustrates a travel route with a zero emissions zone.

FIG. 3 shows a simplified representation of a travel route for a vehicle to illustrate certain issues that arise in the control method for ZEZ and other restricted emissions control. The travel path is illustrated with a first portion 200 preceding a ZEZ portion 202, followed by third portion 204, where the first and third portions 200, 204, are not restricted emissions zones for the example. The durations of travel in each zone 200, 202, 204 are shown as d1, d2 and d3. However, each of d1, d2 and d3 are significantly longer than the typical prediction horizon, illustratively shown as d4, used for purposes of an optimization task that implements a cost function, such as model predictive control (MPC). The prediction horizon d4 is typically in the range of a few to a few tens of seconds. This is because it is desirable to have a sampling rate for the cost function which is in the range of one hertz to one hundred hertz, for example, with ten hertz (0.1 s) being common. The number of samples in the prediction horizon may be, for example and without limitation, in the range of up to a few hundred samples. For example, a total prediction horizon may be in the range of one minute.

A prediction horizon of one minute, however, does not cover the fully dynamic response of a hybrid car battery, particularly with larger batteries such as in plug-in-hybrids. For example, a hybrid car battery may require 10 to 30 minutes to charge from a relatively low SOC (such a 20% SOC) to a higher value that will allow full electric drive through a ZEZ. Extending the prediction horizon by using more samples creates computational burdens that quickly become infeasible. Extending the prediction horizon by using longer sampling times (10 seconds, for example) loses the control granularity that is useful to realize the potential of MPC and other predictive or optimization-based control methods.

The present inventors have recognized that this conflict between hybrid battery dynamics and the time/sampling issues of predictive optimization tends to result in one of two sub-optimal outcomes: a large gap between the desired and actual battery SOC upon reaching the ZEZ due to too-late initiation of battery charging, potentially combined with ongoing demands of the vehicle itself, meaning that the vehicle will be unable to travel the ZEZ in an EV-only mode, or too-hasty battery charging prior to ZEZ entry by charging at a very high rate just prior to reaching the ZEZ, which requires very high power from the engine, which would be fuel-inefficient.

Figure 4:
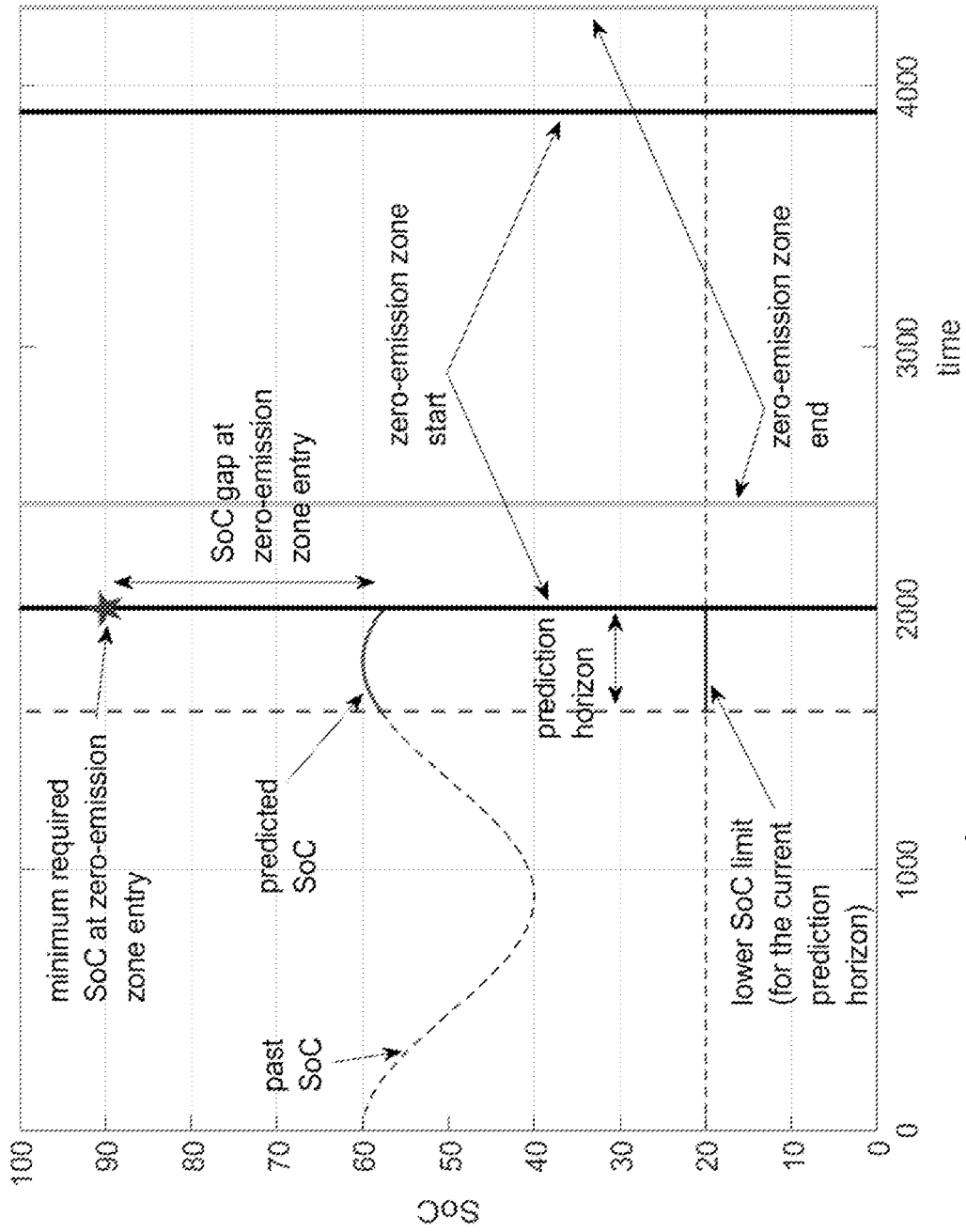
FIGS. 4-5, 6A-6E, 7A-7C, and 8 graphically illustrate various examples of battery state of charge relative to time as a vehicle travels along a route.

FIG. 4 shows an example of the SOC gap at ZEZ entry. The battery SOC can be observed to vary, up and down, with ongoing optimization in the initial period of travel. Upon reaching a point where the prediction horizon includes the ZEZ entry, the SOC simply cannot be charged to reach the minimum required SOC at ZEZ entry due to demands of the vehicle and travel path.

Figure 5:
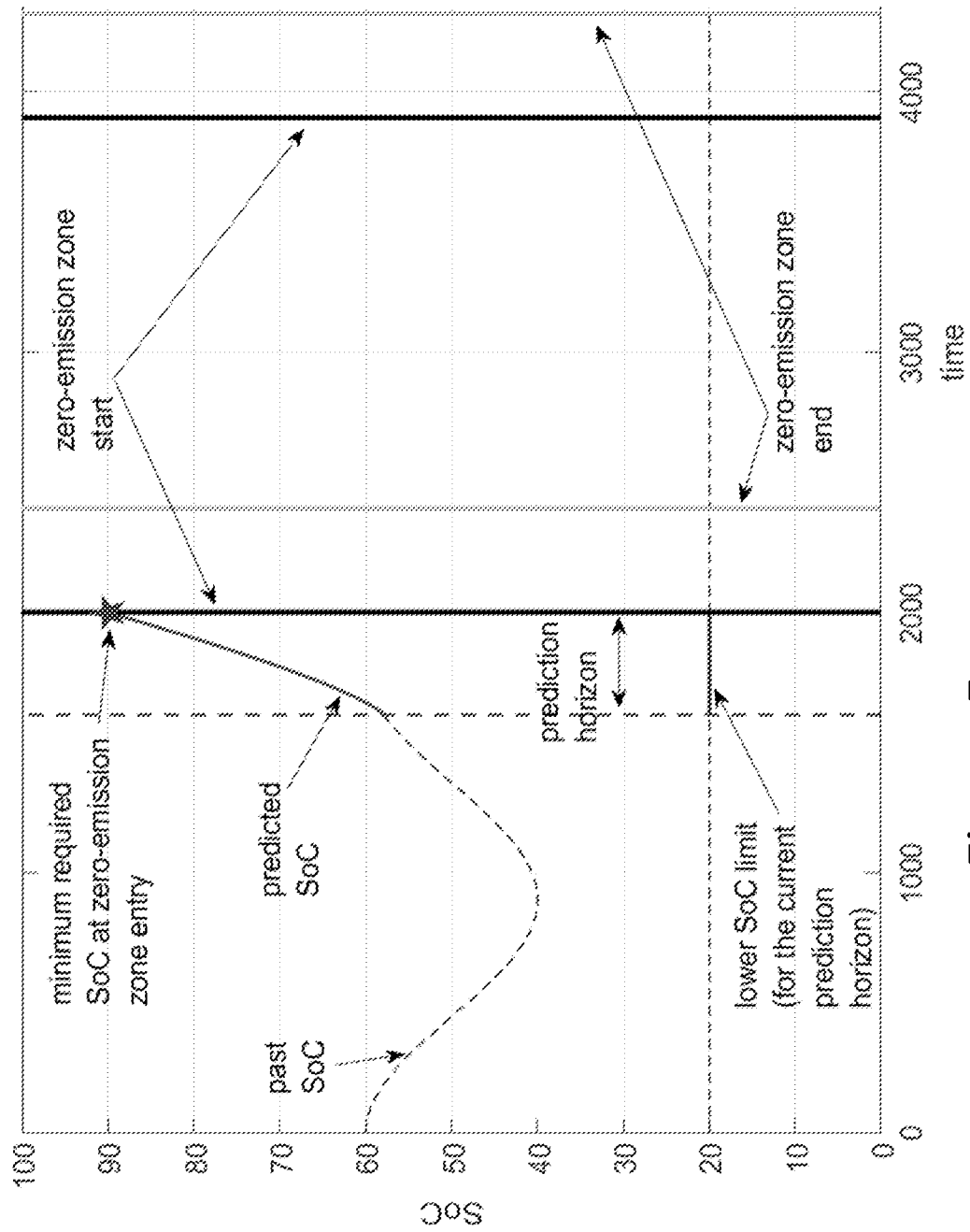

FIG. 5 shows another example. Here, the vehicle is allowed to maximize charging of the battery to achieve desired battery charge levels. As can be seen, once the prediction horizon includes the ZEZ entry point, the battery SOC is quickly driven up by operating the engine at, for example, maximum torque output until the minimum SOC is reached. While the vehicle is now able to travel the ZEZ using only EV driving, the operations needed to achieve such an SOC will be inefficient from the fuel perspective and may increase emissions overall as the engine is driven hard, at high power as the battery is charged once the prediction horizon includes the ZEZ start.

Figure 6A:
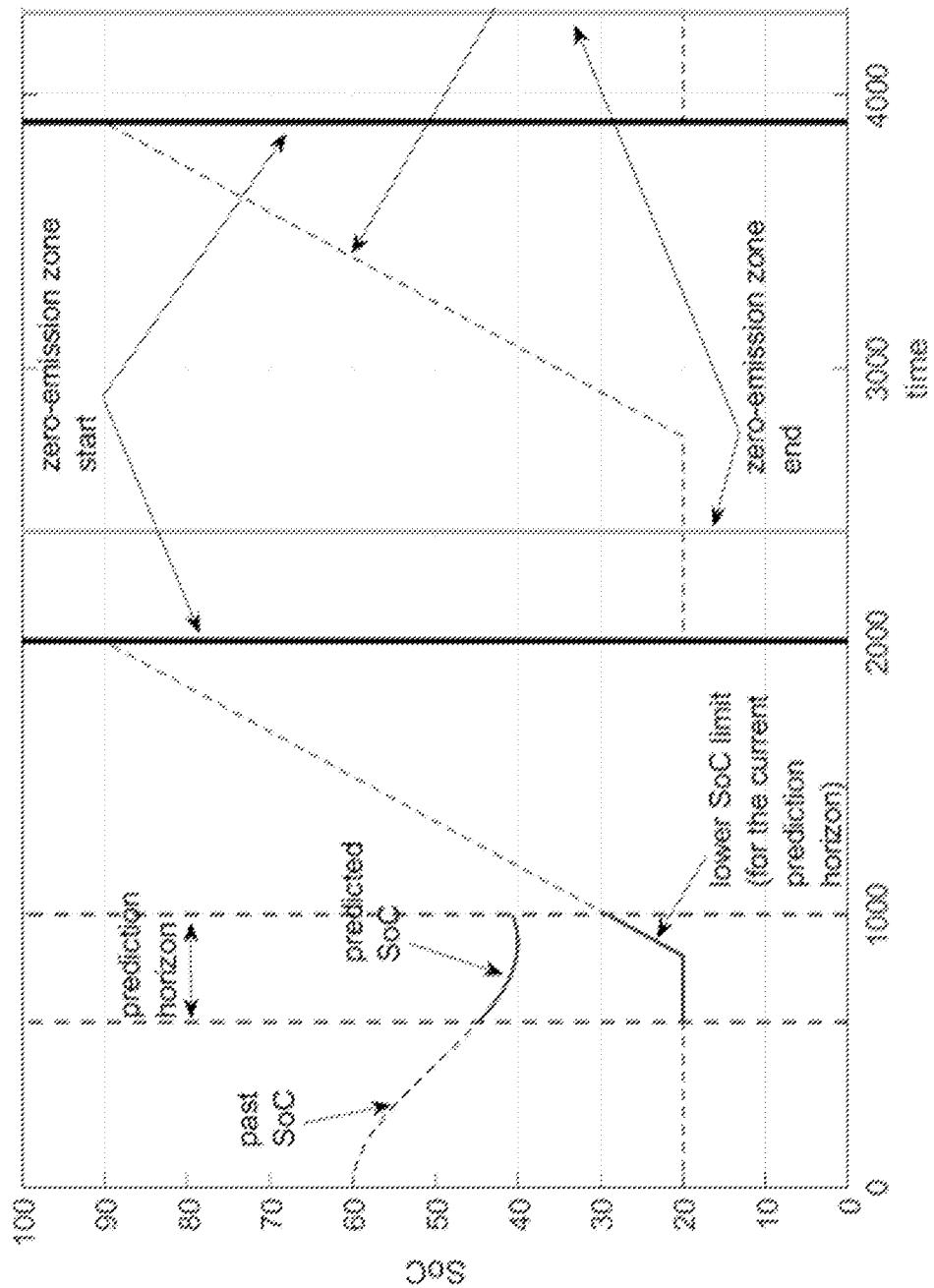
Figure 6B:
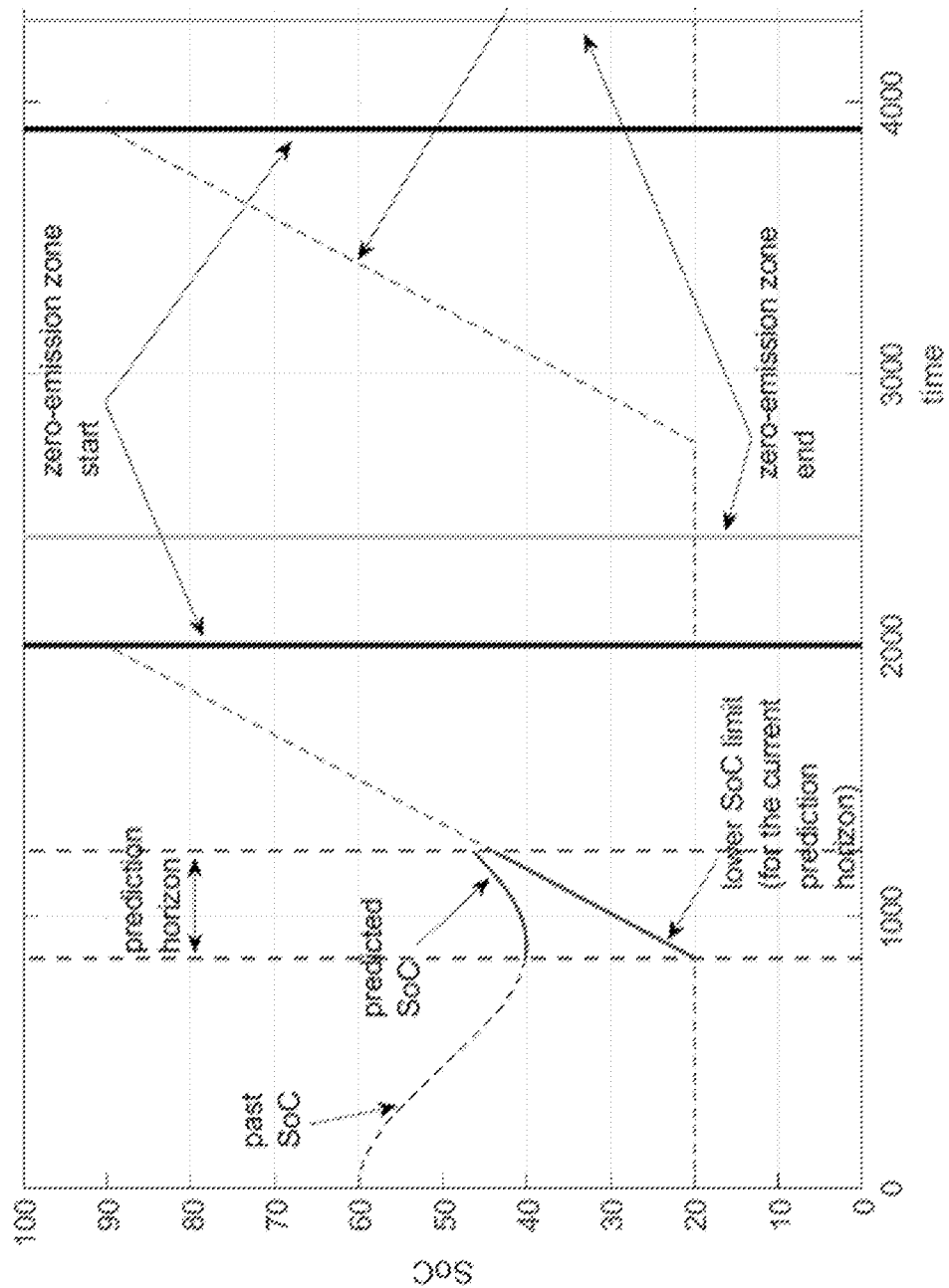
Figure 6C:
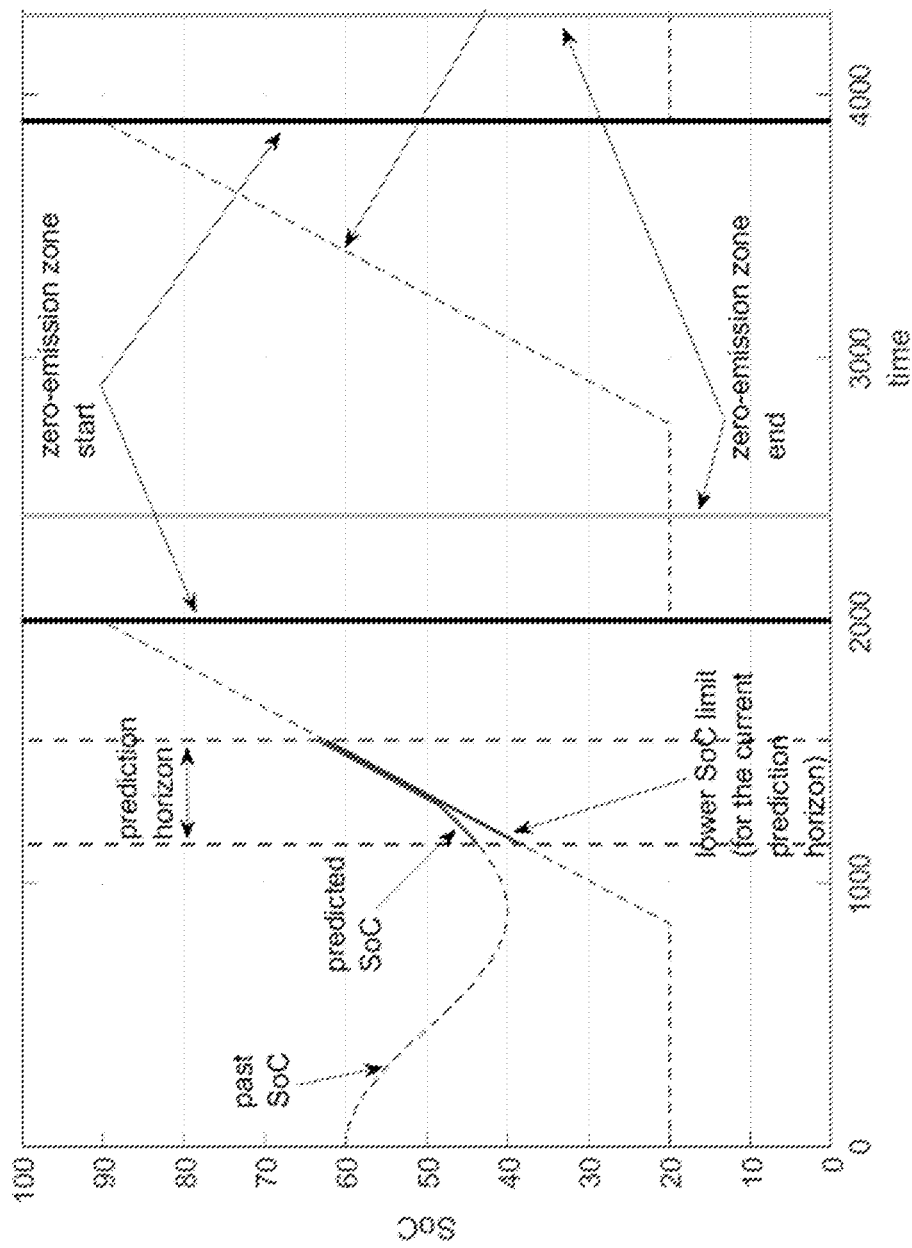

FIG. 6A illustrates an example. Here a lower SOC limit for the current prediction horizon is modified well in advance of the ZEZ start (illustratively a bit more than 1000 seconds ahead of ZEZ start). As a result, the predicted SOC in the prediction horizon will begin to traverse upward as the increasing lower SOC limit rises, as shown in FIG. 6B. FIG. 6C shows a still further step forward in time, as the predicted SOC tracks the upward slope of the lower SOC limit.

Figure 6D:
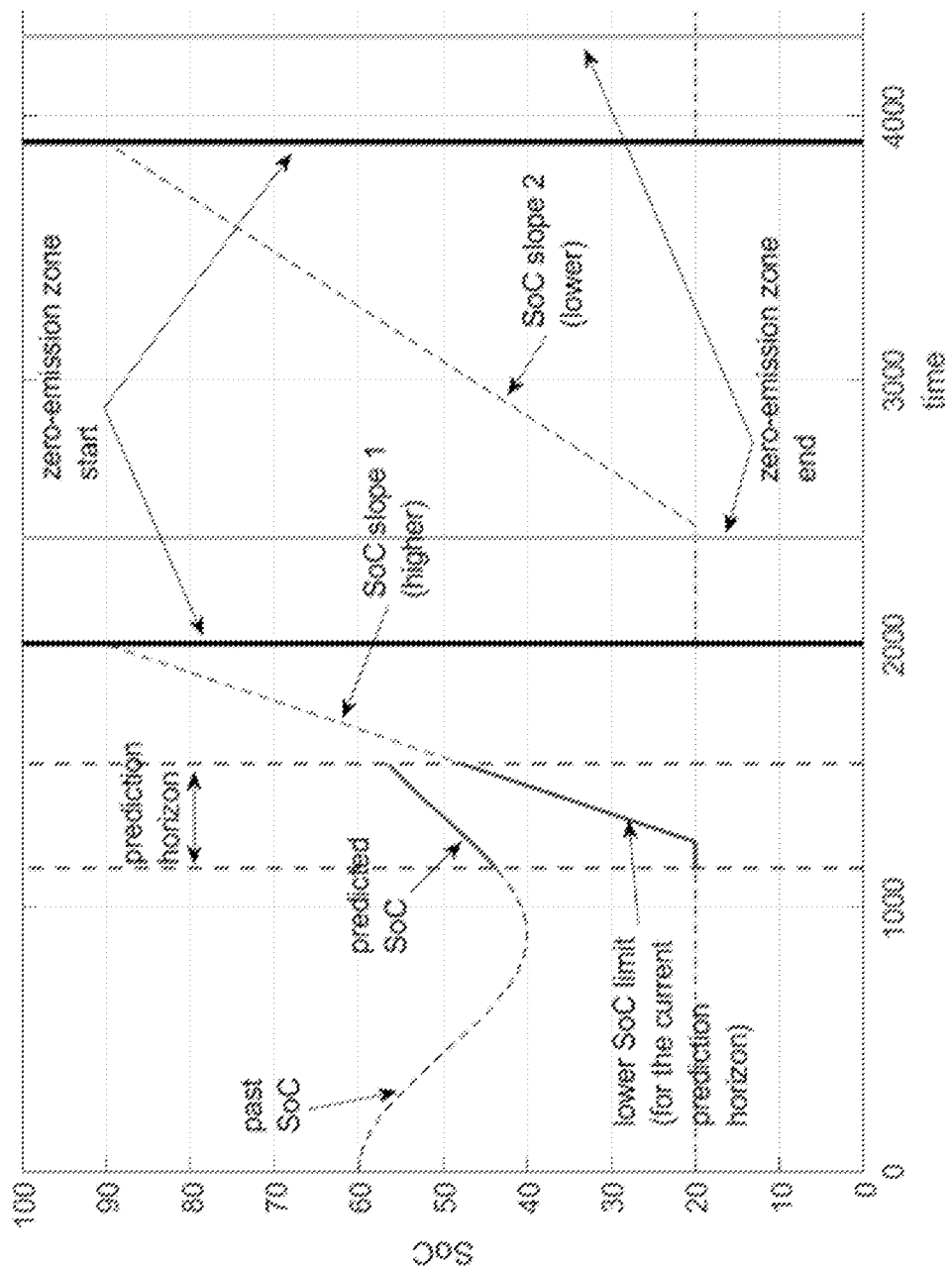
Figure 6E:
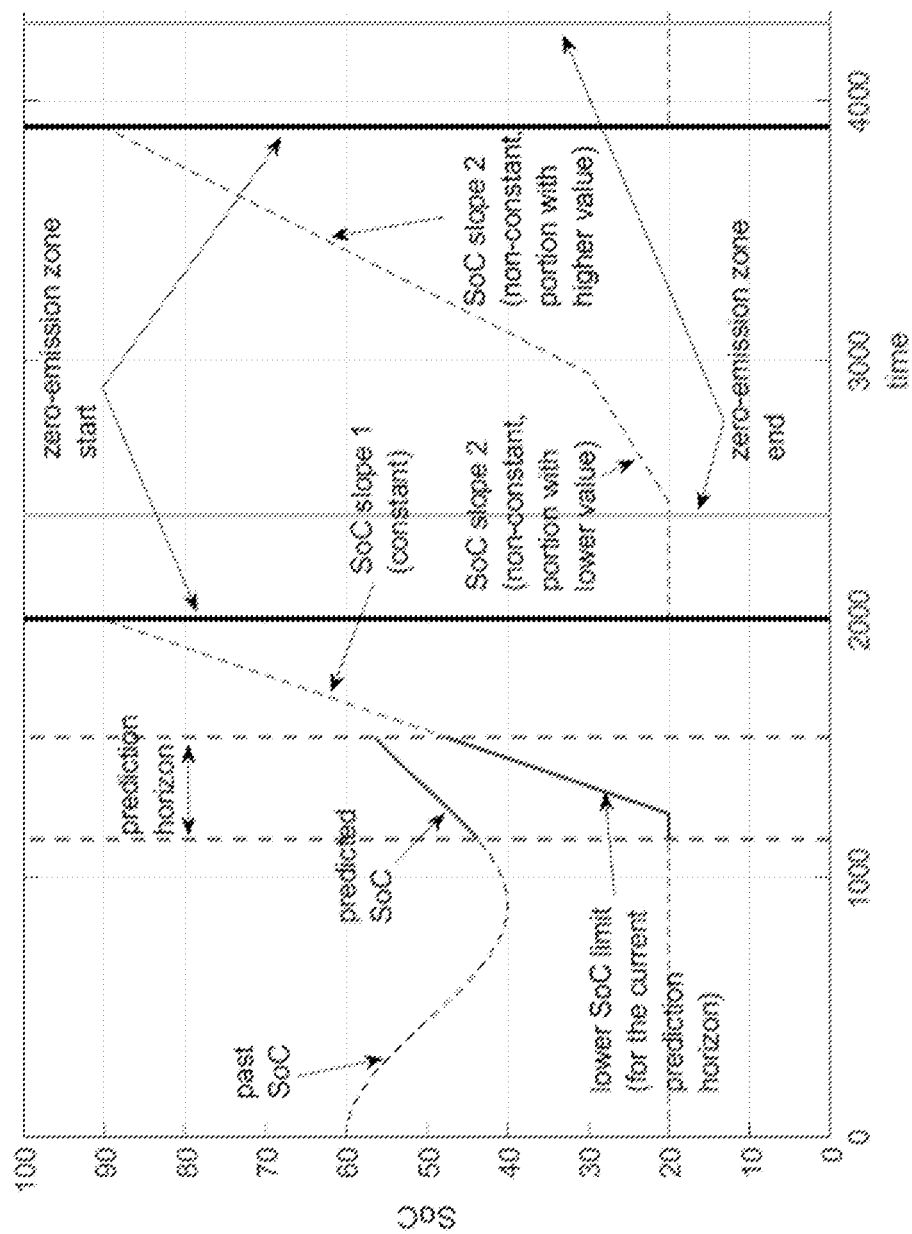

FIG. 6D illustrates a different approach from that of FIGS. 6A-6C. Here, the lower SOC limit has a slope determined from a current lower SOC limit to the ZEZ start. As a result, the lower SOC limit has a different slope for the different ZEZ starts. For example, the lower SOC limit has a higher slope (SOC slope 1 in FIG. 6D) preceding the first ZEZ. The lower SOC limit has a lower slope (SOC slope 2 in FIG. 6D) preceding the second ZEZ. FIG. 6E shows another approach. Here, the lower SOC value between the two ZEZ zones increases with a gradual slope first, and a steeper slope as the ZEZ start is closer.

For each of FIGS. 6A-6E, the lower SOC limits are being adjusted as a function of proximity to the ZEZ. A predictive power split optimization can be used within each of the shorter prediction horizons for example, using optimization as disclosed in U.S. patent application Ser. No. 17/969,181, filed Oct. 19, 2022, titled ENERGY EFFICIENT PREDICTIVE POWER SPLIT FOR HYBRID POWERTRAINS, or U.S. patent application Ser. No. 17/969,359, filed Oct. 19, 2022, titled HIERARCHICAL OPTIMAL CONTROLLER FOR PREDICTIVE POWER SPLIT.

The lower SOC limits for the prediction horizon relevant to the current time sample can be calculated using the proximity, either in a distance or time domain, to the entry to an upcoming restricted emissions zone, such as a ZEZ. One approach is to calculate a lower SOC limit value, $\underline{SOC}_k$ corresponding to a discrete time k, as shown here:

$$\underline{SOC}_k = \max(SOC_{min}, SOC_{des} - d \cdot SOC_{slp}) \quad \{\text{Equation 1}\}$$

Where $SOC_{min}$ is the minimum admissible SOC lower value (for example, 20%, which may be based on secure operation requirements), $SOC_{des}$ stands for the desired minimum SOC value at the ZEZ entry (e.g. 90% if fixed, or variable based on analysis of the restricted emissions zone travel path), d represents the proximity to the restricted emissions zone entry (either in the time domain or in the distance domain) and $SOC_{slp}$ is the slope at which the lower SOC limit value $\underline{SOC}_k$ rises (either in % SOC per unit of time if using the time domain, or in % SOC per unit of distance if using the distance domain).

For a discrete time instance k where the current or predicted position of the vehicle is already in a restricted emissions zone, and particularly a ZEZ, the lower SOC limit is reset to the minimum admissible SOC lower value, $SOC_{min}$.

$\underline{SOC}_k$ can be pre-calculated for some longer time or distance horizon larger than the prediction horizon of the optimization controller (which may be, for example, an MPC controller/analysis). For example, $\underline{SOC}_k$ can be pre-calculated for the whole trip, or a shorter portion thereof which is longer than the optimization prediction horizon. Alternatively, $\underline{SOC}_k$ can be determined in an immediate calculation used only for the upcoming prediction horizon used by the MPC or other optimizer, as desired.

$SOC_{slp}$ can be set as a constant when used in a pre-calculation and/or for immediate calculation. If, desired, and particularly for pre-calculation, $SOC_{slp}$ may be influenced by expected road grade, anticipated traffic density or speed limits, or any other suitable factors. For example, the variable can be given a higher value if the grade between current position and the start of the ZEZ is downhill, or a lower value if the grade is uphill. If traffic density is used, higher traffic density may reduce the variable, and lower traffic density may increase the variable, as less acceleration and power consumption from the ICD would be anticipated with less traffic density. Other factors, such as ambient temperature affecting cabin HVAC demands, or precipitation affecting traction and wheel power consumption may be considered as well. The slope $SOC_{slp}$ may also be varied in response to proximity to the ZEZ start by, for example, using a higher slope farther away from ZEZ start, which would allow the vehicle to begin preparations at greater distance or time away from the ZEZ.

Another example may use both a slope and a weight that varies with distance from the ZEZ, where the slope ($SOC_{slp}$) may be higher at a greater distance/time from ZEZ start, but the penalty for distance from the SOC limit at the end of the optimization prediction horizon may be less due to reduced weight. As the vehicle approaches ZEZ start, the weight used to penalize distance below the SOC lower limit or target can increase, while the slope $SOC_{slp}$ is reduced.

In another example, the above described analysis of projecting vehicle speed and required total torque to reach the start of the ZEZ may be used, and cumulative torque/power demand to the start of the ZEZ can be summed with the equivalent power needed to increase battery SOC to determine both $SOC_{slp}$ as well as the point in time when, or distance at which, the minimum admissible battery charge begins to rise using $SOC_{slp}$. Such an approach may be implemented, for example, in a system having both an upper-level or supervisory controller along with a low-level controller, in which the upper-level controller provides operating parameters to the low-level controller by modelling vehicle performance and lower level behavior to identify optimal settings.

The task of predictive power split with an approach in which a slope and distance calculation is performed to modify the lower SOC limit may be formulated as follows:

$$u(t) = \arg \min_{\Sigma_{k \in \{1,\ldots,N\}} W_{ICE,k} T_{ICE,k}^2} J_{ZEZ1} = \arg \min[J_{PPS,orig} +] \quad \{\text{Equation 2}\}$$

Which may apply relative to the system's normal or original predictive power split limits, using the SOC lower limit calculated using Equation 1. Here, $J_{ZEZ1}$ is a new optimization cost function applicable once the vehicle is approaching the ZEZ, and $J_{PPS,orig}$ is the cost function for a baseline predictive power split as disclosed in U.S. patent application Ser. No. 17/969,181, filed Oct. 19, 2022, titled ENERGY EFFICIENT PREDICTIVE POWER SPLIT FOR HYBRID POWERTRAINS, or U.S. patent application Ser. No. 17/969,359, filed Oct. 19, 2022, titled HIERARCHICAL OPTIMAL CONTROLLER FOR PREDICTIVE POWER SPLIT, the disclosures of which are incorporated herein by reference. Also in Equation 2, N represents the length of the prediction horizon, u(t) stands for vector(s) of the optimized variables calculated at time t, which may include one or more of torque request from the engine, gear request, engine on/off request, etc. $W_{ICE,k}$ stands for the weighting term used for penalizing use of the engine, and is set to a very high value when inside the ZEZ, and is zero otherwise. $T_{ICE,k}$ represents the engine torque applied at time sample k.

Equation 2 may be modified by replacing with a different formulation, such as penalization of the amount of emissions produced while driving inside the ZEZ, though with similar effect.

Individual cases are shown in FIGS. 6A-6E. In FIGS. 6A-6C, for example, the lower SOC limit is not pre-calculated, and $SOC_{slp}$ is set to a constant which is equal for each zero emissions zone. Each of FIGS. 6A-6C represents a different time instance. Some examples may specify how long in advance a ZEZ should be taken into account. For example, a total time horizon or distance horizon to consider may include one to two kilometers distance, or the time (at prevailing traffic speeds or posted speed limits) needed to traverse one to two kilometers of distance. In another example, a period of one to five minutes may be considered. In another example, advance distance may be determined from how long a particular implementation (a hybrid vehicle) would need for charging the battery from a current state to full charge, such that the advance distance to consider for ZEZ analysis varies with current battery state, though within parameters that the vehicle can easily access.

FIG. 6D shows an example with SOC limit pre-calculation, using a higher $SOC_{slp}$ value at slope 1 because an expected downhill is identified in the vehicle travel path before entry to the first ZEZ. Prior to the second ZEZ, a different (lower) $SOC_{slp}$ value is applied because, in the example, high traffic density is anticipated in this region, meaning that the vehicle will have less available power for battery charging.

FIG. 6E shows an example with SOC limit pre-calculation, having a first $SOC_{slp}$ value before the first ZEZ, and two different values used for the $SOC_{slp}$ used before entry to the second ZEZ.

With multiple $SOC_{slp}$ values in the prediction horizon, the above Equation 1 may have two separate formulations as shown in Equation Set 1:

{Eq. Set 1}

$$\underline{SOC_k} = \max(SOC_{min}, SOC_{des} - d \cdot SOC_{slp,1} + \text{offs\_1}),$$

for $d$ in the first subinterval; and $$\underline{SOC_k} = \max(SOC_{min}, SOC_{des} - d \cdot SOC_{slp,2} + \text{offs\_2}),$$

for $d$ in the second subinterval.

Here, offs_1 and offs_2 are used to offset the lower SOC limit correctly and provide a continuous control strategy. In an example, offs_2 would be zero since, for zero proximity, the $\underline{SOC_k}$ would be equal to $SOC_{des}$. On the other hand, offs_1 would be non-zero, negative, and calculated such that at the proximity where the slope changes from $SOC_{slp,1}$ to $SOC_{slp,2}$, the two formulas can yield the same value.

In other examples, the low SOC limit that is calculated as indicating may be applied only to the last SOC sample in each prediction horizon, rather than being modified across each sample of the prediction horizon.

Figure 7A:
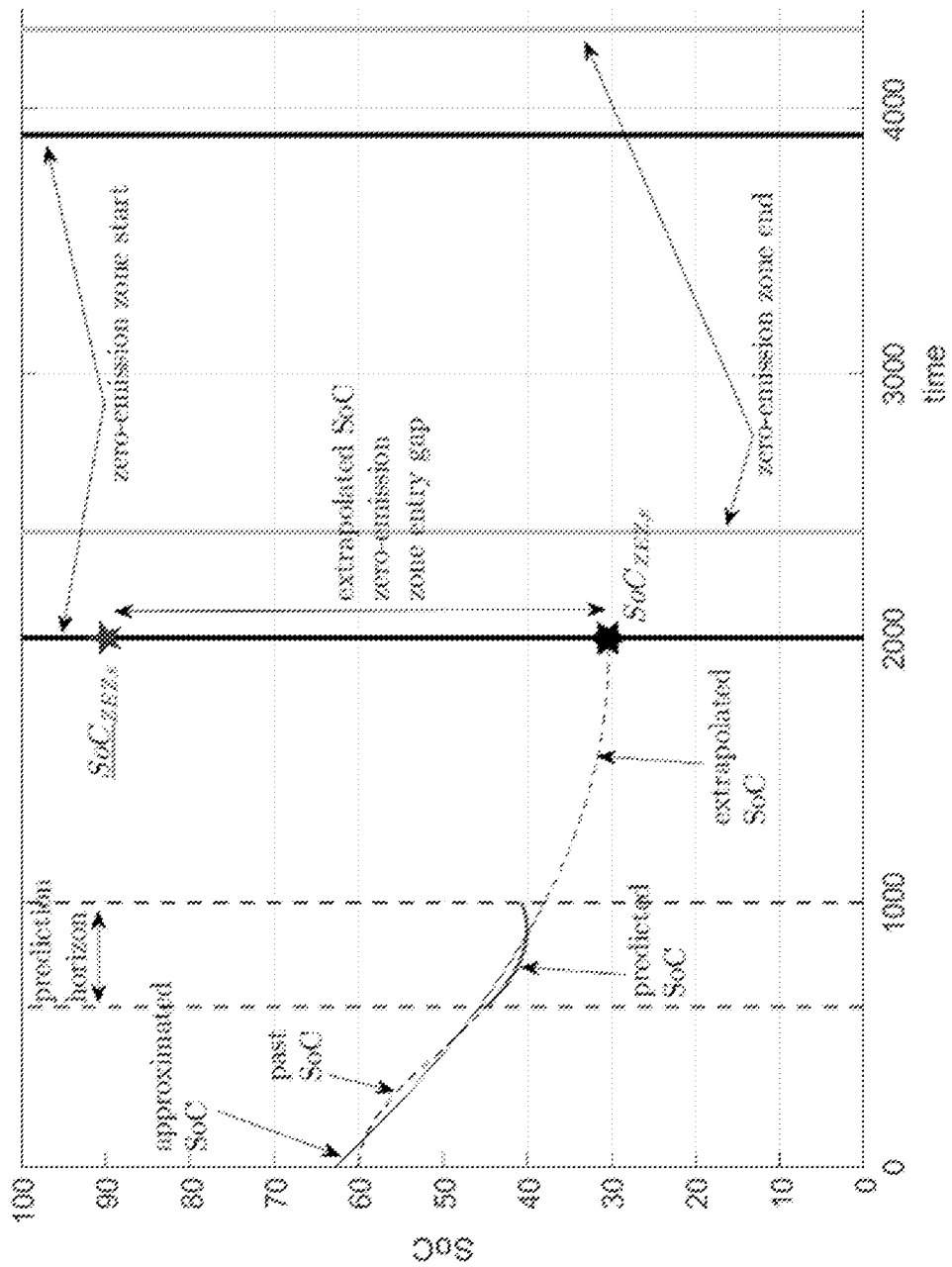

FIG. 7A introduces another illustrative approach. Here, a predicted battery SOC is generated within the prediction horizon used for optimization analysis, such as MPC. In addition, an extrapolated SOC is calculated to the start of an upcoming ZEZ. Then, an extrapolated SOC ZEZ entry gap can be determined using the difference in the extrapolated SOC at ZEZ entry and the SOC target/needed for entry and passage through the ZEZ, as shown. The prediction horizon may be relatively short, covering only significant battery dynamics and allowing for granular control and optimization, for example, with a prediction horizon of about 60 seconds, or more or less (ranges from 10 seconds to 120 seconds, for example, or more or less if desired, noting tradeoffs of computation burden, sample length/granularity, etc. as described previously). The extrapolation, on the other hand, may extend well beyond the prediction horizon.

For example, the controller may include a model of past SOC values (for example, determined from a prior passage along the same route). Thus a set of past SOC values may be $\{SOC_{k-M}, SOC_{k-M+1}, \ldots SOC_{k-2}, SOC_{k-1}, SOC_k\}$ and the currently predicted SOC values in the prediction horizon $\{SOC_{k+1}, SOC_{k+2}, \ldots SOC_{k+N}\}$ can be used in a least-squares sense using a chosen approximation function such as a 1 or $2^{nd}$ order polynomial, a piece-wise polynomial function, or other more complex function, as desired. The result is an approximation function, $f_{SoC,appr}(t)$ which can be determined as a function of time. If desired, the approximation function may instead be converted to the distance domain. In the preceding, k stands for the current time moment, M represents the number of historical SOC samples used for approximation, and N corresponds to the prediction horizon of the MPC controller. If desired, M=0 may indicate no past samples are used, and extrapolation will be based on the MPC controller analysis. In other examples M=N, or M>>N, if desired.

A second model can then be used to extrapolate the SOC evolution to the time/location of ZEZ entry. If working in the time domain, a simple estimation may determine average vehicle speed over a chosen past time interval (which may be the samples of M+N, if desired), and time of ZEZ entry, $t_{ZEZ,e}$, can be determined. Alternatively, expected velocity may be calculated, using any of expected speed limits in the travel path, or a velocity calculation from preview information as described previously in discussing the predictive power split. The predicted SOC value at entry to the SOC, $SOC_{ZEZ,e}$, can then be:

$$SOC_{ZEZ,e} = f_{SoC,appr}(t_{ZEZ,e}) \quad \{\text{Equation 3}\}$$

The original cost function $J_{PPS,orig}$ of the predictive power split, containing for example, terms penalizing fuel consumption, excessive battery degradation, SOC limits violation, and others, is then augmented with an additional term penalizing the extrapolated SOC zero-emission zone entry gap, which is the difference between the desired minimum SOC value at the zero-emission zone entry and $SOC_{ZEZ,e}$ from Equation 3. An example is shown in Equation 4:

{Equation 4}

$$J_{ZEZ2} = J_{PPS,orig} + W_{ZEZ}(\max(0, \underline{SOC_{ZEZ,e}} - SOC_{ZEZ,e}))^2 + \sum_{k \in \{1,\ldots,N\}} W_{ICE,k} T_{ICE,k}^2$$

Where $J_{ZEZ2}$ corresponds to the new cost function for use in predictive power split, with zero emission zone handling, and $W_{ZEZ}$ is a weighting factor for the extrapolated SOC zero emission zone entry gap penalization. $W_{ZEZ}$ may be constant, or may be a function of proximity to ZEZ entry, for example, by increasing as the vehicle gets closer to ZEZ entry, thought is not necessarily limited to these methods. As before, the last term, the penalty for use of the engine inside the ZEZ may be replaced with other formulations.

Multiple ZEZ may be handled as well. For example, extrapolation may be done for all considered ZEZ in the route, and the cost function may contain a sum of the extrapolated SOC ZEZ entry gap values. Equation 5 is illustrative:

{Equation 5}

$$J_{ZEZ2} = J_{PPS,orig} + \sum_{i=1}^{n_z} W_{ZEZ,i}(\max(0, \underline{SoC_{ZEZ,e,i}} - SoC_{ZEZ,e,i}))^2 + \sum_{k \in \{1,\ldots,N\}} W_{ICE,k} T_{ICE,k}^2$$

Here, $n_z$ is the number of considered zero emissions zones (or other restricted emissions zones), $W_{ZEZ,i}$ stands for the weighting term for the i-th extrapolated SOC ZEZ entry gap, $\underline{SOC_{ZEZ,e,i}}$ represents the desired minimum SOC at entry to the i-th ZEZ (where the desired minimum may be constant or can vary for each ZEZ), and $SOC_{ZEZ,e,i}$ is the extrapolated SOC value at entry to the i-th ZEZ. Predictive power split can then be implemented using the updated cost function. For example, these methods can be integrated in the methods of U.S. patent application Ser. No. 17/969,181, filed Oct. 19, 2022, titled ENERGY EFFICIENT PREDICTIVE POWER SPLIT FOR HYBRID POWERTRAINS, or U.S. patent application Ser. No. 17/969,359, filed Oct. 19, 2022, titled HIERARCHICAL OPTIMAL CONTROLLER FOR PREDICTIVE POWER SPLIT.

Figure 7B:
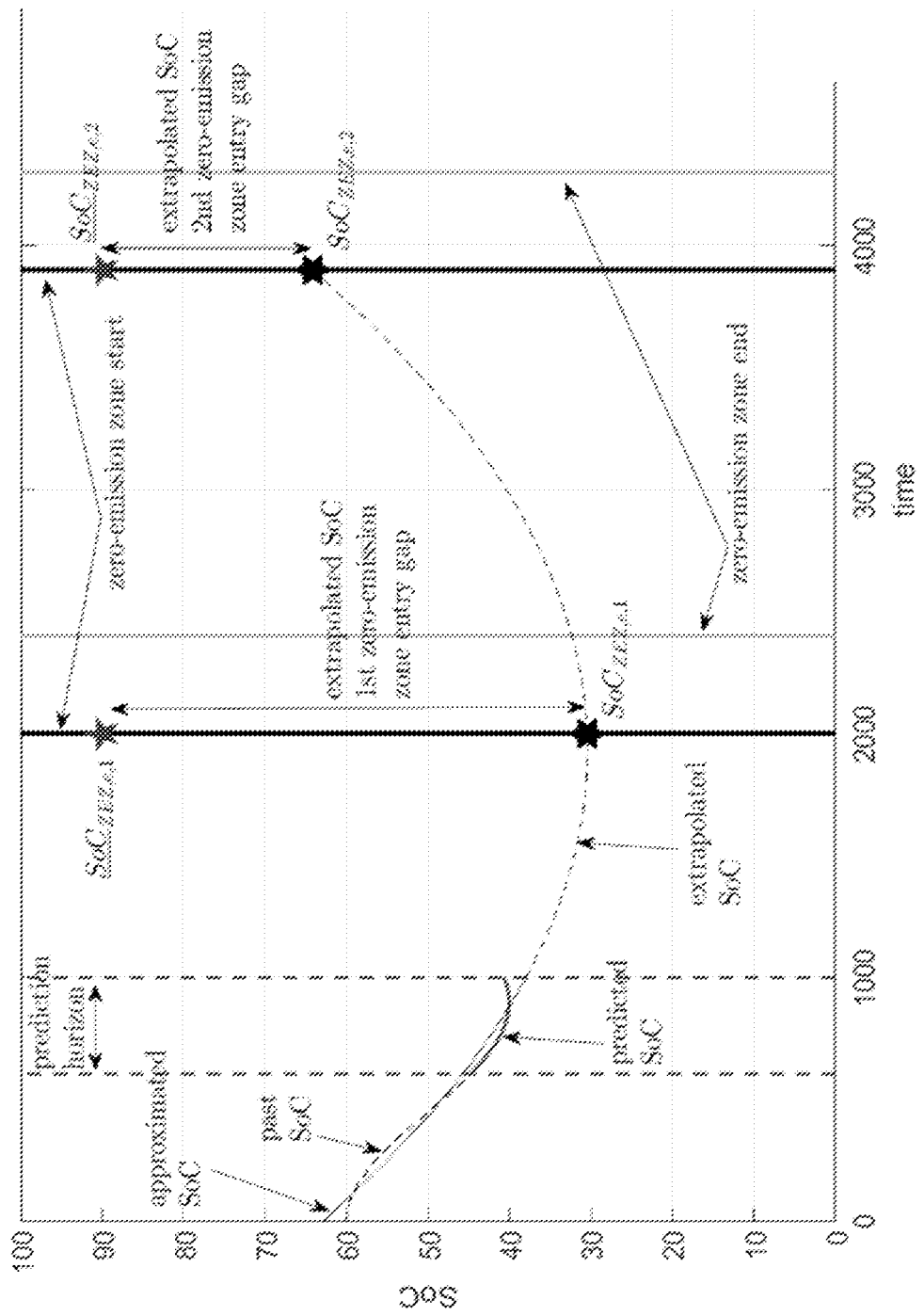
Figure 7C:
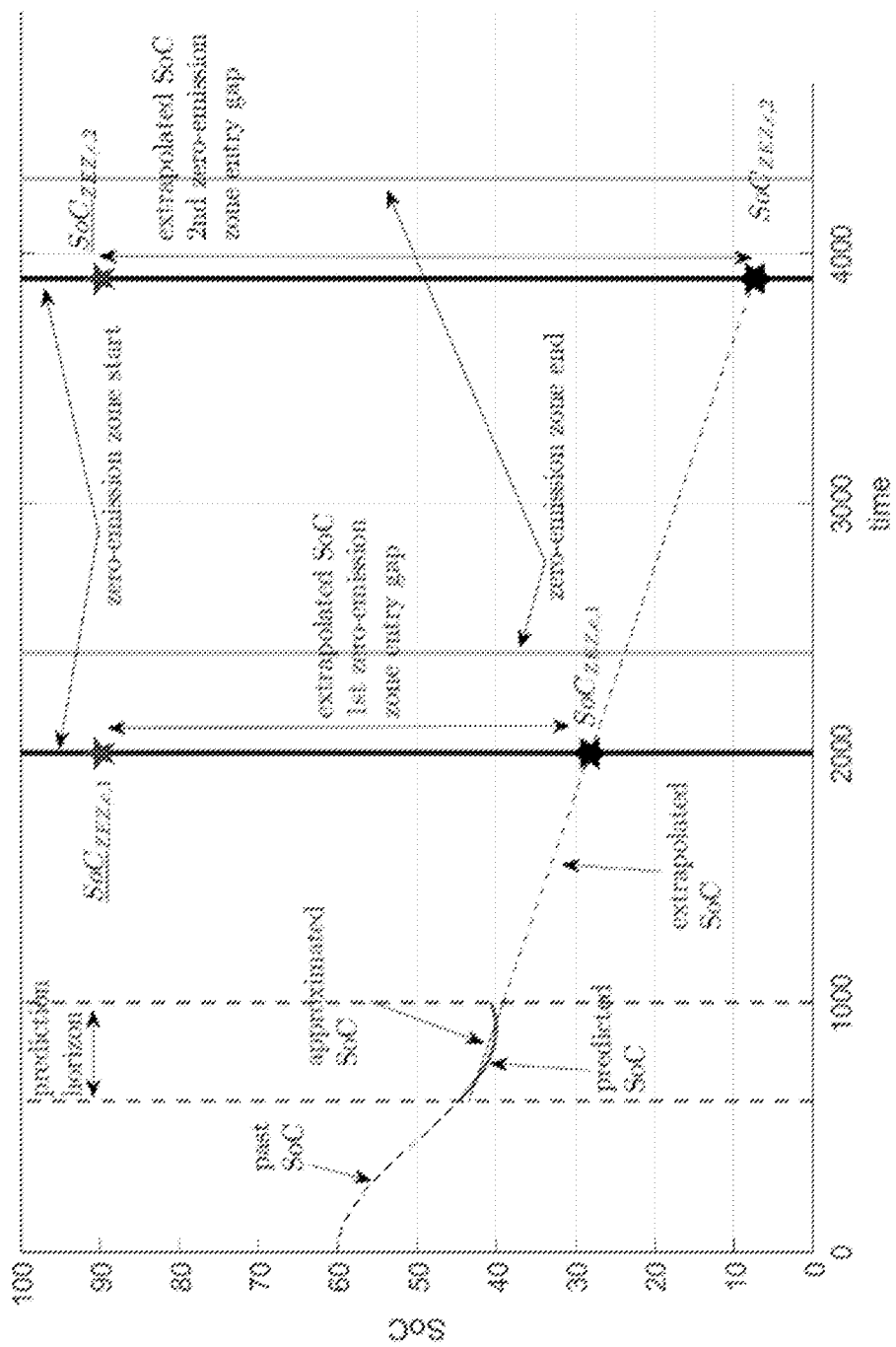

FIG. 7A illustrates the analysis at a given point in time, where the extrapolated SOC is shown, leading to $SOC_{ZEZ,e}$, and a ZEZ entry gap as shown relative to $\underline{SOC_{ZEZ,e}}$. FIG. 7B illustrates extrapolation out to a second ZEZ, using both historical data (preceding the prediction horizon) and the data generated within the prediction horizon. FIG. 7C shows another illustration of extrapolation, here using only the data within the prediction horizon and ignoring historical data. It should be noted that the extrapolation can be updated with each iteration of the optimization (MPC, often), so that as the prediction horizon moves forward in time, the extrapolation becomes shorter and, likely, more accurate. The SOC gap at ZEZ entry should also decrease due to use of the modified predictive power split function.

Figure 8:
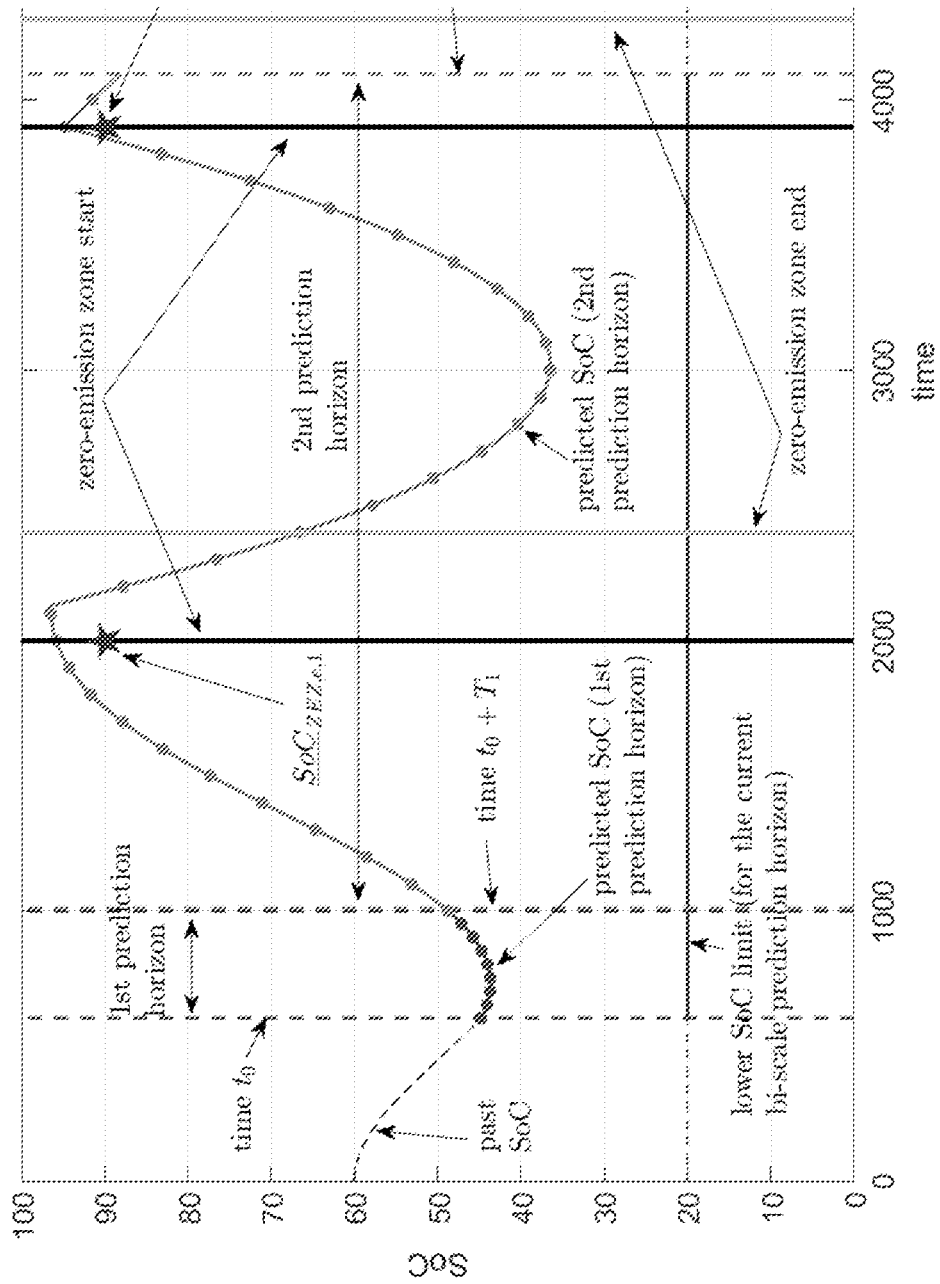

FIG. 8 is a graph for another illustrative example. Here, a control solution uses a bi-scale prediction horizon. A $1^{st}$ prediction horizon, serving as the first part of the bi-scale prediction horizon, covers a relatively short time period of up to, for example, one minute, using a short sample period of, for example, one second. The $1^{st}$ prediction horizon is sized to cover the battery dynamic response. A $2^{nd}$ prediction horizon, serving as the second part of the bi-scale prediction horizon, follows the $1^{st}$ prediction horizon and extends for ten or more minutes (in the example, 3000 seconds, for example) and encompasses the entire upcoming first zero emission zone, in the example. The $2^{nd}$ prediction horizon, to remain computationally feasible, has a much longer sample period greater than, for example, ten seconds, and may be as long as a minute.

For the $1^{st}$ prediction horizon, the manipulated variables are sampled at a shorter sampling time, and the state/output variables obtained from the MPC internal model are assumed to be sampled at this shorter sampling time as well. The $1^{st}$ prediction horizon enables fine control granularity at each sampling instance, to provide high control quality. With the short (normal) sampling time, accurate predictions can be obtained. In implementation, a first model predicting a first part of the prediction horizon is used in the interval $[t_0, t_0+T_1]$, where to is the current time instance, and $T_1$ stands for the first part of the prediction horizon.

The $2^{nd}$ prediction horizon with the longer sampling period is modeled by MPC at the long sampling interval (such as ten seconds or more). Doing so allows optimization over a long prediction horizon including the end of the ZEZ, so that efficient and sufficient pre-charging prior to ZEZ entry can be attained, with admissibly low computational demands. The overall computational burden can thus be managed, while allowing evaluation over a long prediction horizon. In implementation, a second model predicting a second part of the prediction horizon is used in the interval $[t_0+T_1, t_0+T_2]$, where $T_2$ stands for the overall length of the bi-scale prediction horizon. In the below, $T_3$ is used to represent the second part of the prediction horizon:

{Equation 6}

$$u(t) = \arg\min J_{ZEZ3} =$$

$$\arg\min\left[J_{PPS,orig} + \sum_{i=1}^{n_z} W_{ZEZ,i}\left(\max\left(0, \underline{SoC_{ZEZ,e,i}} - SoC(t_{ZEZ,e,i})\right)\right)^2 + \right.$$

$$\left.\left(\sum_{t \in \{t_0+T_{s,1},\ldots,t_0+T_1\}} W_{ICE,FH}(t)T_{ICE}^2(t) + \sum_{t \in \{t_0+T_1+T_{s,2},\ldots,t_0+T_2\}} W_{ICE,SH}(t)T_{ICE}^2(t)\right)\right]$$

In which the SOC is characterized by the following:

{Equation 7}

$$SoC(t) =$$

$$\begin{cases} f_1(SoC(t-T_{s,1}), u(t-T_{s,1}), p_1) & \forall t \in \{t_0+T_{s,1}, t_0+2T_{s,1}, \\ & t_0+3T_{s,1}, \ldots, t_0+T_1\} \\ f_2(SoC(t-T_{s,2}), u(t-T_{s,2}), p_2) & \forall t \in \{t_0+T_1+T_{s,2}, t_0+T_1+2T_{s,2}, \\ & t_0+T_1+3T_{s,2}, \ldots, t_0+T_2\} \end{cases}$$

Where $J_{ZEZ3}$ is the new cost function for this third approach to ZEZ handling using bi-scale optimization, and function $J_{PPS,orig}$ is the original predictive power split function as described previously. Further, $n_z$ represents the number of zero emission zones over the bi-scale prediction horizon, $W_{ZEZ,i}$ stands for the weighting term for the i-th ZEZ SOC gap penalization; this weighting term may itself be variable based on the distance (in time or position) from the ZEZ entry so that the applied weighting term for this penalty increases as the i-th ZEZ entry nears. The desired minimum SOC value at entry to the i-th ZEZ is designated as $\underline{SOC_{ZEZ,e,i}}$, and the predicted SOC value at the time of entry to the i-th ZEZ is shown as $SOC(t_{ZEZ,e,i})$. $T_{ICE}(t)$ stands for the engine torque at time t.

Weights penalizing use of the engine torque during the first and second parts of the prediction horizon are shown in Equation 6 as $W_{ICE,FH}(t)$ and $W_{ICE,SH}(t)$, respectively; each is a function of time and are set to a very high value if, at time t, the vehicle is (predicted to be) inside a ZEZ, and zero otherwise; these "very high" values can be the same or different, as desired, and may be variable with distance (in time or position) from the ZEZ entry, again, increasing as ZEZ entry nears. The penalty for ZEZ operation may be replaced with an emissions-based/referenced penalty, if desired.

In Equation 7, functions $f_1$ and $f_2$ are prediction models used over the first and second parts of the bi-scale prediction horizon, parameterized using parameters $p_1$ and $p_2$. As before, u(t) stands for optimized variables/control signals, such as engine torque request, gear request, engine on/off request, etc., and to represents the current time instance. Finally, $T_{s,1}$ and $T_{s,2}$ are the sampling times used over the first and second parts of the biscale prediction horizon. In general, $T_{s,1} \leq T_{s,2}$, and often, $T_{s,1} << T_{s,2}$.

Returning to FIG. 8, the $1^{st}$ prediction horizon, in which the short-term prediction model and shorter sampling time, $T_{s,1}$, is used, corresponds to time instances in the interval $[t_0, t_0+T_1]$. The $2^{nd}$ prediction horizon, with the long-term prediction model and longer sampling time, $T_{s,2}$, corresponds to time instances in the interval $[t_0+T_1, t_0+T_2]$. In FIG. 8, only the SOC profile is shown, but the sampling would apply to other manipulated variables, such as engine torque request, gear request, engine on/off request, etc.

In FIG. 8, at the point in time shown (to), each of the ZEZ entry points are located in the $2^{nd}$ prediction horizon; it should be understood that as the vehicle moves along the travel path, the $1^{st}$ prediction horizon will move to the right in the image and eventually encompass one ZEZ entry and then the other ZEZ entry. The gap, if any, between desired SOC, $SOC_{ZEZ,e,i}$, at each ZEZ entry and the predicted SOC, is thus calculated in the image of FIG. 8 using the analysis, sampling, and model applicable to the $2^{nd}$ prediction horizon.

In some situations, $\underline{SOC_{ZEZ,e,i}}$, may be known or chosen in advance. For example, a simple choice may be made to set $\underline{SOC_{ZEZ,e,i}}$, as a fixed value, such as 80% to 90% of the battery maximum SOC. This may be computationally simple but operationally suboptimal. In other examples, preview information may be used to set $\underline{SOC_{ZEZ,e,i}}$, such as by determining road grade and other factors that may affect power demand (traffic, speed limits, stop signs/lights, ambient conditions, etc.). For example, if the ZEZ is essentially a downhill segment of the upcoming roadway, the ZEZ may be energy neutral, allowing a relatively low $\underline{SOC_{ZEZ,e,i}}$ to be selected, such as setting it at or below the lower SOC limit of the vehicle, thereby ensuring that the $W_{ZEZ,i}$ penalty for a given ZEZ will not affect the analysis. An alternative approach is to introduce a rule that sets the $W_{ZEZ,i}$ penalty to zero, or even removes the term entirely from the analysis, when an energy neutral ZEZ is in the travel path.

The ZEZ SOC target, $SOC_{ZEZ,e,i}$, may be set using analysis of the vehicle route in some examples. For example, a speed profile on the route through the ZEZ can be calculated using one or more of prevailing traffic speeds, speed limits, and traffic control data (traffic lights and/or roundabouts, stop signs, etc.). The speed profile is combined with data regarding road grade and curvature, as well as vehicle capabilities, forces and summed torque needed to traverse the route through the ZEZ can be determined. The analysis may be as described previously in relation to a vehicle preview. From the predicted torque, energy needed from the battery can be determined using a conversion factor which may be determined, for example, by vehicle testing or from manufacturer data (which would likely be derived from vehicle testing). In some examples, discrete math may be used to determine torque for each time instance in a modeled traverse through the ZEZ and then current drawn from the battery for each such time instance can be estimated. Summing the current drawn by the sample period would yield total charge needed from the battery. Such pre-modelling may use inputs and analysis discussed in copending patent applications U.S. patent application Ser. No. 17/969,181, filed Oct. 19, 2022, titled ENERGY EFFICIENT PREDICTIVE POWER SPLIT FOR HYBRID POWERTRAINS, or U.S. patent application Ser. No. 17/969,359, filed Oct. 19, 2022, titled HIERARCHICAL OPTIMAL CONTROLLER FOR PREDICTIVE POWER SPLIT.

In other examples, prior drive cycles may be used to generate $\underline{SOC_{ZEZ,e,i}}$ values. For example, a bus travelling the same route every day could rely on its own prior passage, or that of a similar bus in a fleet, through a particular ZEZ or other restricted emissions zone to determine how much battery energy or charge is necessary to pass through without requiring the engine to start. This use of prior drive cycles to determine $\underline{SOC_{ZEZ,e,i}}$ may apply to all the above analyses. In another example, the experience of one vehicle passing through a ZEZ or other restricted emissions zone may be communicated to other (similar) vehicles, and such data may also be used when selecting/setting $\underline{SOC_{ZEZ,e,i}}$. When doing so, a given vehicle may adjust the value of $\underline{SOC_{ZEZ,e,i}}$ based on received data from other vehicles to account for the state of health of the vehicle's battery (which affects total SOC and battery internal resistance, for example) and any vehicle specific variations of weight, load, driver habits (aggressive or passive driver, or example), tires, efficiency, cabin controls/power usage, etc., as well as ambient conditions and/or traffic data.

Figure 9:
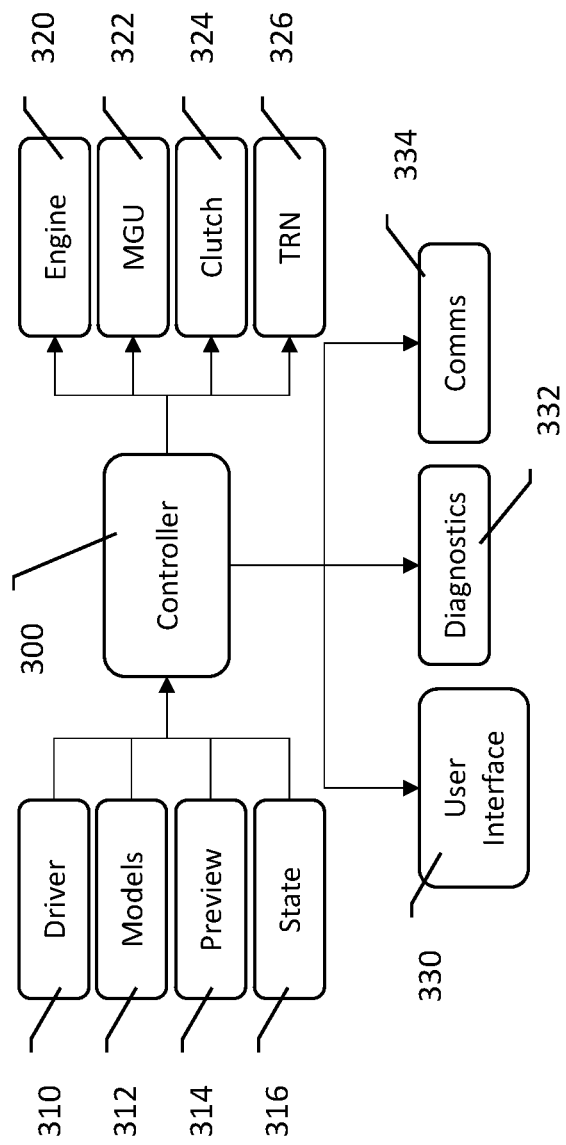
FIG. 9 shows a vehicle architecture.
Figure 10:
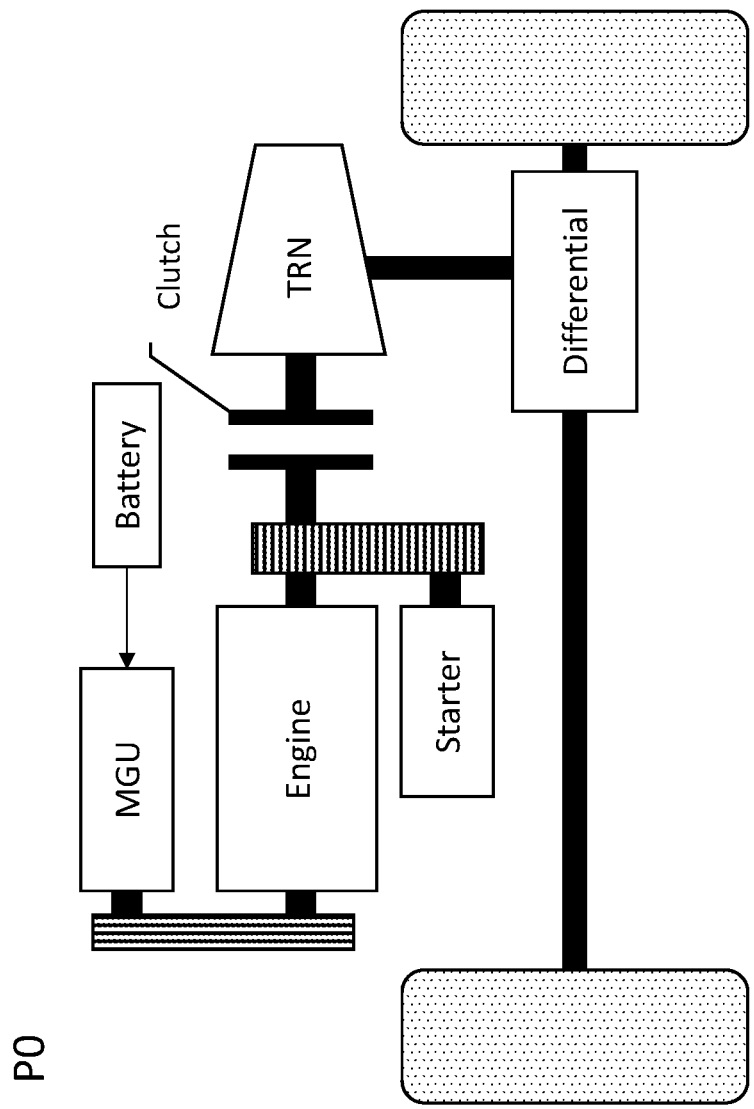
FIGS. 10-14 show several hybrid vehicle powertrain configurations.

FIG. 9 shows an overall control architecture. The overall control structure includes a vehicle controller 300 that receives data/inputs from each of a driver 310, various system models or other stored information 312, preview information 314 such as from navigation, communication, and vehicle sensors, and current state data 316 relating to the current status of the system (such as engine and battery sensors), and generates control outputs for the engine 320, the MGU 322, a clutch 324, and transmission 326. The controller 300 may also output data to a user interface 330, allowing the driver to receive information about ongoing operations, to a diagnostics module 332 where operating data, anomalies, faults, etc. can be stored, and/or to a communication module 334 for transmission off vehicle, such as to a fleet manager.

FIGS. 10-14 show several illustrative hybrid vehicle configurations. A P0 hybrid in FIG. 10 includes a battery that powers the MGU, which is coupled by a belt to the transmission drive shaft, which is also coupled to the engine. The engine and MGU cannot be decoupled here. A starter for the engine is also belt coupled to the transmission drive shaft. A clutch separates the transmission from the drive shaft. The transmission outputs torque to the differential, which couples to the drive wheels as shown.

Figure 11:
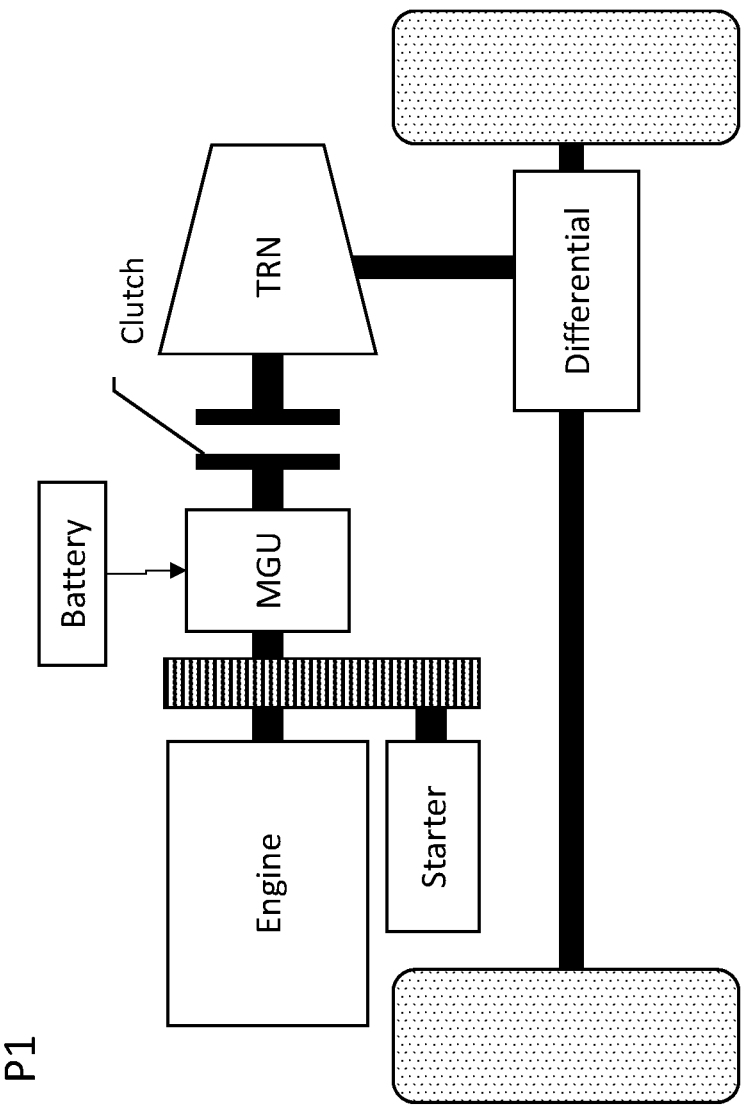

A P1 hybrid in FIG. 11 moves the MGU on the other side of the engine, and places it directly on the drive shaft. A starter for the engine is belt coupled to the transmission drive shaft. The engine and MGU cannot be decoupled here. A clutch separates the transmission from the drive shaft. The transmission outputs torque to the differential, which couples to the drive wheels as shown. The above described power split controller and associated analysis can be applied to a P0 or P1 hybrid architecture with minor changes. One adjustment is that the engine cannot be turned off while the vehicle is moving, because the MGU and ICE are coupled together. As a result, engine on/off can only be used when the vehicle is stopped.

Figure 12:
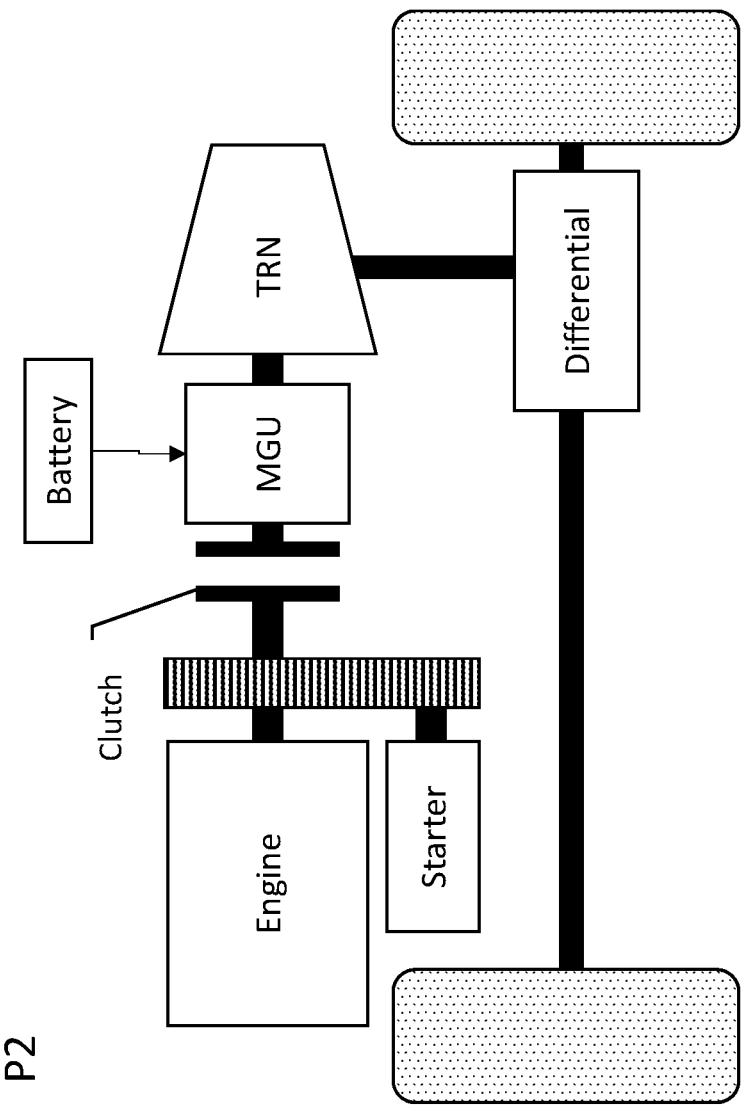

A P2 hybrid in FIG. 12 moves the MGU on the other side of the clutch. Here the engine and starter are coupled on one side of the clutch, and can be decoupled from the MGU and transmission. This makes the engine-off decision more useful. The MGU is not allowed to decouple, however. The transmission outputs torque to the differential, which couples to the drive wheels as shown.

Figure 13:
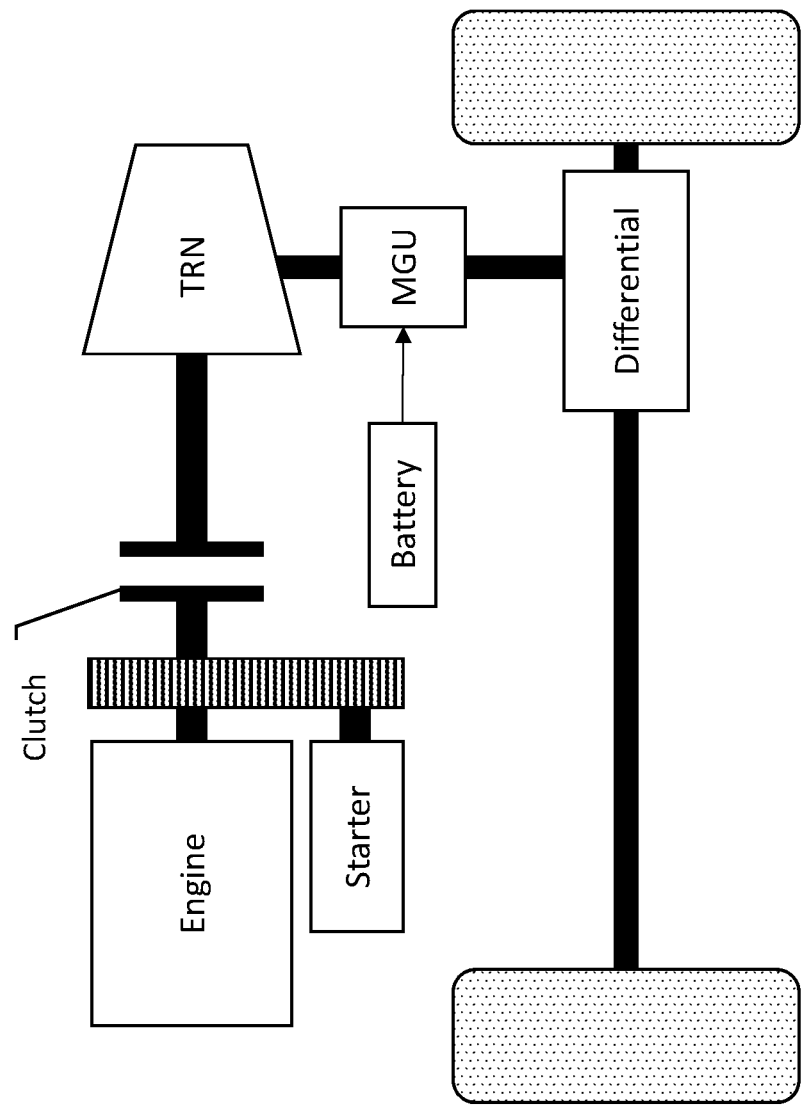
Figure 14:
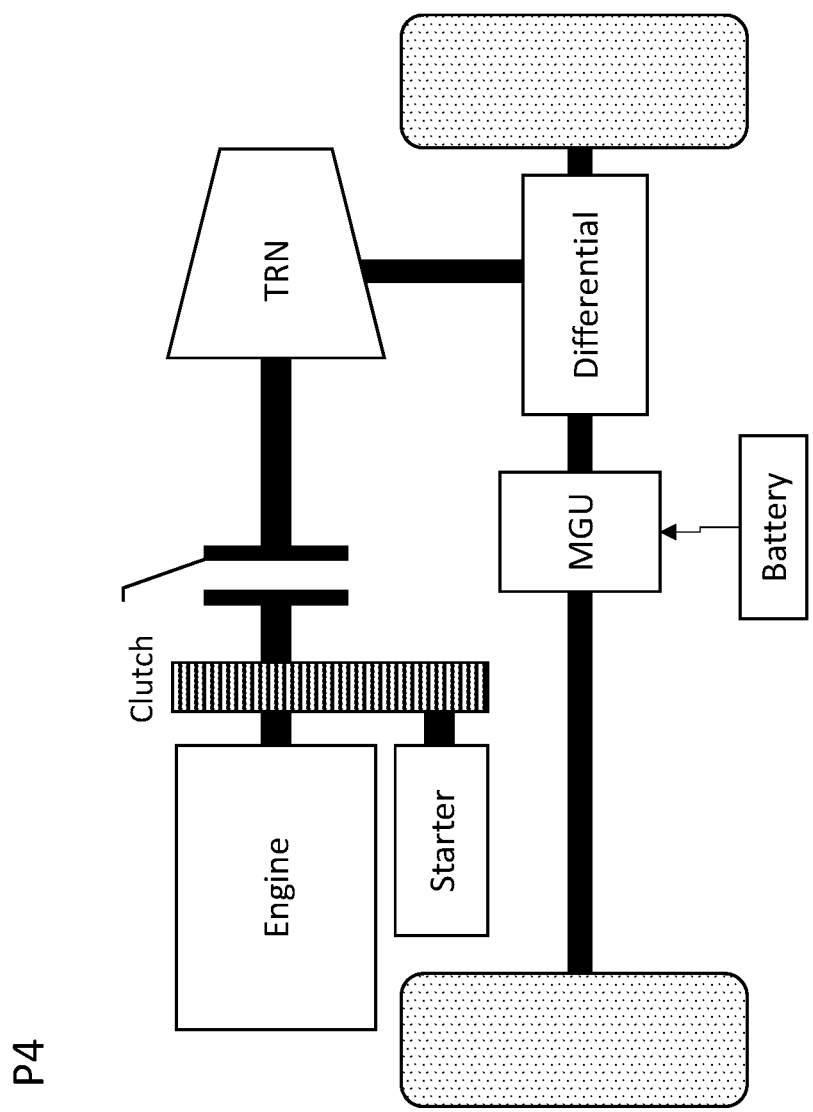

A P3 hybrid in FIG. 13 now places the engine, starter and clutch as with P2, but moves the MGU to a location between the transmission and the differential. A P4 hybrid in FIG. 14 places the MGU on the other side of the differential. An alternative to the P4 hybrid may include plural MGUs on each of the drive wheels. The above described power split controller is readily applied in each of the P3 and P4 hybrid configurations.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." Moreover, in the claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the protection should be determined with reference to the appended claims, along with the full scope of equivalents to which such claims are entitled.

What is claimed is:

1. A vehicle comprising:
a first power source and a second power source, the second power source being a rechargeable battery, the first and second power sources configured to provide drive power to a transmission for output to a wheel of the vehicle;
a controller configured to determine power utilization between the first power source and the second power source, including generating a lower state of charge (SOC) limit value for the battery of the second power source, the lower SOC limit value indicative of a minimum target state of charge of the battery calculated at specific locations or points in time along the vehicle route; and
a navigation system configured to determine a vehicle route and identify in the vehicle route a restricted emissions zone; wherein:
the controller is configured to receive an indication of an entry to and an exit from the restricted emissions zone along the vehicle route and adjust the lower SOC limit value as a function of proximity to the restricted emissions zone by:
determining a total charge from the second power source needed to traverse the restricted emissions zone from the entry location to the exit location;
calculating a desired SOC at entry to the restricted emissions zone from the total charge;
determining torque needed to reach the entry of the restricted emissions zone; and
calculating a series of lower SOC limit values for use along the route which increase as distance to the entry location reduces; and
wherein the controller is further configured to determine power utilization between the first power source and the second power source by performing a cost function minimization using a prediction horizon, wherein the series of lower SOC limit values are used in the cost function minimization as penalties responsive to the estimated SOC of the battery of the second power source at an end of the prediction horizon being below a lower SOC limit value at the end of the prediction horizon.

2. The vehicle of claim 1, wherein the controller is configured to reduce the lower SOC limit value upon entry to the restricted emissions zone.

3. The vehicle of claim 1, wherein the restricted emissions zone is a zero emissions zone (ZEZ), and one of the series of lower SOC limit values is set to allow the vehicle to traverse the ZEZ using only power from the second power source.

4. The vehicle of claim 1 wherein the controller is configured to determine control parameters for the first and second power sources such that the battery of the second power source has an actual SOC at the entry to the restricted emissions zone which enables the vehicle to traverse the restricted emissions zone while operating as an electric vehicle.

5. The vehicle of claim 1 wherein the controller is configured to calculate the series of lower SOC limit values for use along the route which increase as distance to the entry location reduces by working backward from a restricted zone entry SOC limit value that will allows the vehicle to traverse the restricted emissions zone while operating in a selected mode, to a default SOC limit value, and determining an SOC slope that defines differences from one SOC limit value to a next SOC limit value throughout the series of lower SOC limit values.

6. The vehicle of claim 1, wherein the controller is configured to determine torque needed to reach the entry of the restricted emissions zone by analysis of one or more of road grade, curvature, traffic, and speed limits in the vehicle route.

7. The vehicle of claim 1, wherein the controller is configured to determine a total charge from the second power source needed to traverse the restricted emissions zone from the entry location to the exit location by analyzing one or more of road grade, curvature, traffic, and speed limits in the vehicle route.

8. The vehicle of claim 1, wherein the controller is configured to determine a total charge from the second power source needed to traverse the restricted emission zone from the entry location to the exit location by analyzing a prior trip through the restricted emissions zone.

9. A vehicle comprising:
a first power source and a second power source, the second power source being a rechargeable battery, the first and second power sources configured to provide drive power to a transmission for output to a wheel of the vehicle;
a controller configured to determine power utilization between the first power source and the second power source, including generating a lower state of charge (SOC) limit value for the battery of the second power source, the lower SOC limit value indicative of a minimum target state of charge of the battery calculated at specific locations or points in time along the vehicle route; and
a navigation system configured to determine a vehicle route and identify in the vehicle route a restricted emissions zone; wherein:
the controller is configured to receive an indication of an entry to and an exit from the restricted emissions zone along the vehicle route and adjust the lower SOC limit value as a function of proximity to the restricted emissions zone by:
determining a total charge from the second power source needed to traverse the restricted emissions zone from the entry location to the exit location;
calculating a desired SOC at entry to the restricted emissions zone from the total charge;
extrapolating from a set of past or predicted future SOC values for the battery of the second power source a projected SOC value at entry to the restricted emission zone;
further wherein the controller is configured to determine power utilization between the first power source and the second power source and generate control values for the first and second power sources by performing a cost function minimization using a prediction horizon, and wherein the cost function comprises a penalty term which is a product of a weighting value multiplied by an SOC shortfall calculated by subtracting the projected SOC value from the desired SOC at entry to the restricted emissions zone.

10. The vehicle of claim 9, wherein the controller is configured to determine a total charge from the second power source needed to traverse the restricted emissions zone from the entry location to the exit location by analyzing one or more of road grade, curvature, traffic, and speed limits in the vehicle route.

11. The vehicle of claim 9, wherein the controller is configured to determine a total charge from the second power source needed to traverse the restricted emission zone from the entry location to the exit location by analyzing a prior trip through the restricted emissions zone.

12. The vehicle of claim 9, wherein the set of past or predicted future SOC values includes one or more past SOC values and one or more future SOC values calculated within the prediction horizon.

13. The vehicle of claim 9, wherein the set of past or predicted future SOC values includes only future SOC values calculated within the prediction horizon.

14. A vehicle comprising:
a first power source and a second power source, the second power source being a rechargeable battery, the first and second power sources configured to provide drive power to a transmission for output to a wheel of the vehicle;
a controller configured to determine power utilization between the first power source and the second power source, including generating a lower state of charge (SOC) limit value for the battery of the second power source, the lower SOC limit value indicative of a minimum target state of charge of the battery calculated at specific locations or points in time along the vehicle route; and
a navigation system configured to determine a vehicle route and identify in the vehicle route a restricted emissions zone; wherein:
the controller is configured to receive an indication of an entry to and an exit from the restricted emissions zone along the vehicle route, and to perform a cost function analysis to determine operating parameters including power split between the first power source and the second power source as follows:
including in a cost function a first term for a first prediction horizon having a first duration and a first sample length;
including in the cost function a second term for a second prediction horizon occurring after the first prediction horizon, the second prediction horizon having a second duration that is at least twice the first duration and a second sample length that is at least twice the first sample length; and
determining the operating parameters by minimizing the cost function including calculations throughout the first prediction horizon and the second prediction horizon.

15. The vehicle of claim 14, wherein the second prediction horizon is sufficiently long to include each of the entry to and the exit from the restricted emissions zone.

16. The vehicle of claim 14, wherein the second prediction horizon is at least ten times as long as the first prediction horizon, and the second sample length is at least ten times the first sample length.

17. The vehicle of claim 14, wherein:
the controller is configured to analyze a path through the restricted emissions zone and determine the lower battery state of charge (SOC) limit value for entry to the restricted emissions zone;
the controller is configured to determine a predicted battery SOC at entry to the restricted emissions zone as part of the cost function analysis, and include a penalty in the cost function analysis applicable if the predicted battery SOC at entry to the restricted emission zone is below the lower battery SOC limit value for entry to the restricted emissions zone.

18. The vehicle of claim 17, wherein the controller is configured to determine the lower battery SOC limit value for entry to the restricted emission zone by analyzing one or more of road grade, curvature, traffic, and speed limits in the vehicle route.

19. The vehicle of claim 14, wherein:
the controller is configured to determine the lower battery SOC limit value for entry to the restricted emissions zone from data related to a prior traverse of the restricted emissions zone by the vehicle; and
the controller is configured to determine a predicted battery SOC at entry to the restricted emissions zone as part of the cost function analysis, and include a penalty in the cost function analysis applicable if the predicted battery SOC at entry to the restricted emission zone is below the lower battery SOC limit value for entry to the restricted emissions zone.

* * * * *